US012661732B2

(12) United States Patent
Juliusson et al.

(10) Patent No.: US 12,661,732 B2
(45) Date of Patent: Jun. 23, 2026

(54) MANIPULATION OF RESONANT ELEMENTS IN SWITCHING POWER SUPPLIES

(71) Applicant: The ESAB Group, Inc., North Bethesda, MD (US)

(72) Inventors: Lars David Leif Juliusson, Västra Frölunda (SE); Björn Daniel Landin, Mölndal (SE); Philip Magnus Andersson, Floda (SE)

(73) Assignee: THE ESAB GROUP, INC., North Bethesda, MD (US)

( * ) Notice: Subject to any disclaimer, the term of this patent is extended or adjusted under 35 U.S.C. 154(b) by 0 days.

(21) Appl. No.: 18/676,601

(22) Filed: May 29, 2024

(65) Prior Publication Data

US 2025/0367748 A1 Dec. 4, 2025

(51) Int. Cl.
 B23K 9/10 (2006.01)
 B23K 9/09 (2006.01)
 (Continued)

(52) U.S. Cl.
 CPC ............ B23K 9/1062 (2013.01); B23K 9/093 (2013.01); B23K 9/0953 (2013.01); H02M 3/015 (2021.05); H02M 7/53871 (2013.01)

(58) Field of Classification Search
 CPC ............... H02M 1/0058; H02M 3/015; H02M 7/53871; B23K 9/1062; B23K 9/093; B23K 9/0953
 See application file for complete search history.

(56) References Cited

U.S. PATENT DOCUMENTS 4,864,479 A 9/1989 Steigerwald et al.
5,406,051 A 4/1995 Lai
 (Continued)

FOREIGN PATENT DOCUMENTS

AT 402868 B 1/1997
CN 201290072 Y 8/2009
 (Continued)

OTHER PUBLICATIONS

Tebianian Hamed et al.: "High frequency full-bridge Class-D inverter using eGaN FET with dynamic dead-time control", 2016 IEEE Pels Workshop On Emerging Technologies: Wireless Power Transfer (WOW), IEEE, Oct. 4, 2016 (Year: 2016).*
 (Continued)

*Primary Examiner* — Topaz L. Elliott
(74) *Attorney, Agent, or Firm* — Edell, Shapiro & Finnan, LLC

(57) ABSTRACT

A system to generate weld power for a welding process comprises: a power supply including a power inverter having multiple switches controlled by multiple switching signals such that each switch is alternately turned ON and OFF within each switching cycle of one of the multiple switching signals, to supply a current to an output circuit of the power supply that is configured to convert the current to the weld power, wherein the power inverter includes a capacitor and a capacitor switch connected in series with each other and across a switch of the multiple switches; and a controller to monitor a weld parameter and control the capacitor switch to either connect the capacitor across, or disconnect the capacitor from, the switch continuously across multiple cycles of a respective one of the multiple switching signals, depending on whether the weld parameter meets a predetermined operating condition of the welding process.

9 Claims, 18 Drawing Sheets

(51) Int. Cl.
*B23K 9/095* (2006.01)
*H02M 3/00* (2006.01)
*H02M 7/5387* (2007.01)

(56) References Cited

U.S. PATENT DOCUMENTS

| | | | |
|---|---|---|---|
| 5,444,356 A | 8/1995 | Reynolds et al. | |
| 5,546,294 A * | 8/1996 | Schutten | H02M 1/44 |
| | | | 363/17 |
| 5,615,095 A | 3/1997 | Reynolds et al. | |
| 5,710,696 A | 1/1998 | Reynolds et al. | |
| 7,136,294 B2 | 11/2006 | Phadke et al. | |
| 7,158,392 B2 | 1/2007 | Hosokawa et al. | |
| 7,889,477 B2 | 2/2011 | Neubarth et al. | |
| 8,269,141 B2 | 9/2012 | Daniel et al. | |
| 8,378,646 B2 | 2/2013 | Shimada et al. | |
| 8,581,147 B2 | 11/2013 | Kooken et al. | |
| 8,629,661 B2 | 1/2014 | Shimada et al. | |
| 8,644,035 B2 | 2/2014 | Jain et al. | |
| 8,724,348 B2 | 5/2014 | Sase et al. | |
| 8,785,816 B2 | 7/2014 | Kooken et al. | |
| 9,154,026 B2 | 10/2015 | Schrom et al. | |
| 9,391,532 B2 | 7/2016 | Reiter et al. | |
| 9,455,638 B2 | 9/2016 | Waffler | |
| 9,621,051 B2 | 4/2017 | Wagner | |
| 9,641,079 B2 | 5/2017 | Kroesswang-Ridler et al. | |
| 9,647,555 B2 | 5/2017 | Kooken et al. | |
| 9,751,150 B2 | 9/2017 | Daniel et al. | |
| 9,855,620 B2 | 1/2018 | Kooken et al. | |
| 9,906,148 B2 | 2/2018 | Sanchez et al. | |
| 9,956,639 B2 | 5/2018 | Kooken et al. | |
| 9,985,530 B2 | 5/2018 | Sasaki et al. | |
| 10,193,446 B2 * | 1/2019 | Barthold | H02M 7/4837 |
| 10,374,520 B2 | 8/2019 | Wagner et al. | |
| 10,442,309 B2 | 10/2019 | Goetz | |
| 10,651,733 B2 | 5/2020 | Schrom et al. | |
| 10,744,587 B2 | 8/2020 | Kooken et al. | |
| 10,998,810 B2 | 5/2021 | Watanabe et al. | |
| 11,282,625 B2 | 3/2022 | Ishibashi et al. | |
| 11,588,391 B1 * | 2/2023 | Liu | H02M 3/07 |
| 2011/0292687 A1 * | 12/2011 | Barthold | H02M 7/49 |
| | | | 363/140 |
| 2012/0153729 A1 * | 6/2012 | Song | H02M 3/33584 |
| | | | 307/82 |
| 2014/0092639 A1 | 4/2014 | Engineerin | |
| 2017/0025954 A1 * | 1/2017 | Barthold | H02M 7/4837 |
| 2019/0199236 A1 * | 6/2019 | Mnich | H02M 7/797 |
| 2020/0338659 A1 | 10/2020 | Lincoln | |
| 2021/0242789 A1 * | 8/2021 | Su | H02M 1/0025 |
| 2023/0136912 A1 * | 5/2023 | Bolohan | H02M 3/33573 |
| | | | 363/17 |

FOREIGN PATENT DOCUMENTS

| | | | | | |
|---|---|---|---|---|---|
| CN | 201699602 U | | 1/2011 | | |
| CN | 102281010 A | | 12/2011 | | |
| CN | 102594174 A | | 7/2012 | | |
| CN | 104625333 A | * | 5/2015 | | B23K 9/1043 |
| CN | 109033532 B | | 12/2018 | | |
| CN | 109822193 A | | 5/2019 | | |
| CN | 112234858 A | | 1/2021 | | |
| CN | 112953235 A | | 6/2021 | | |
| CN | 113809943 A | | 12/2021 | | |
| DE | 19805408 C2 | | 9/1999 | | |
| DE | 19942228 A1 | | 3/2001 | | |
| DE | 20114660 U1 | | 2/2002 | | |
| DE | 102018114437 A1 | | 8/2019 | | |
| DE | 102019101748 A1 | | 7/2020 | | |
| EP | 704957 A2 | | 4/1996 | | |
| EP | 898360 A1 | | 2/1999 | | |
| EP | 1081841 B1 | | 3/2001 | | |
| EP | 2288013 A1 | | 2/2011 | | |
| EP | 2826125 B1 | | 1/2015 | | |
| EP | 3915186 A1 | | 12/2021 | | |
| FR | 2947681 B1 | | 1/2011 | | |
| FR | 2988232 B1 | | 9/2013 | | |
| JP | 05591666 B2 | | 9/2014 | | |
| KR | 20220155742 A | | 11/2022 | | |
| TW | 1818731 B | * | 10/2023 | | H02M 3/07 |
| WO | 2007145388 A1 | | 12/2007 | | |
| WO | 2013136004 A3 | | 9/2013 | | |
| WO | 2020152076 A1 | | 7/2020 | | |

OTHER PUBLICATIONS

EPO Extended Search Report for Application 25179452.5, dated Nov. 5, 2025 (Year: 2025).*

Extended European Search Report for European Patent Application No. 25179452.5 dated Nov. 5, 2025, 10 pages.

Tebianian Hamed et al.: "High frequency full-bridge Class-D inverter using eGaN FET with dynamic dead-time control", 2016 IEEE PELS Workshop On Emerging Technologies: Wireless Power Transfer (WOW), IEEE, Oct. 4, 2016, pp. 95-99.

* cited by examiner

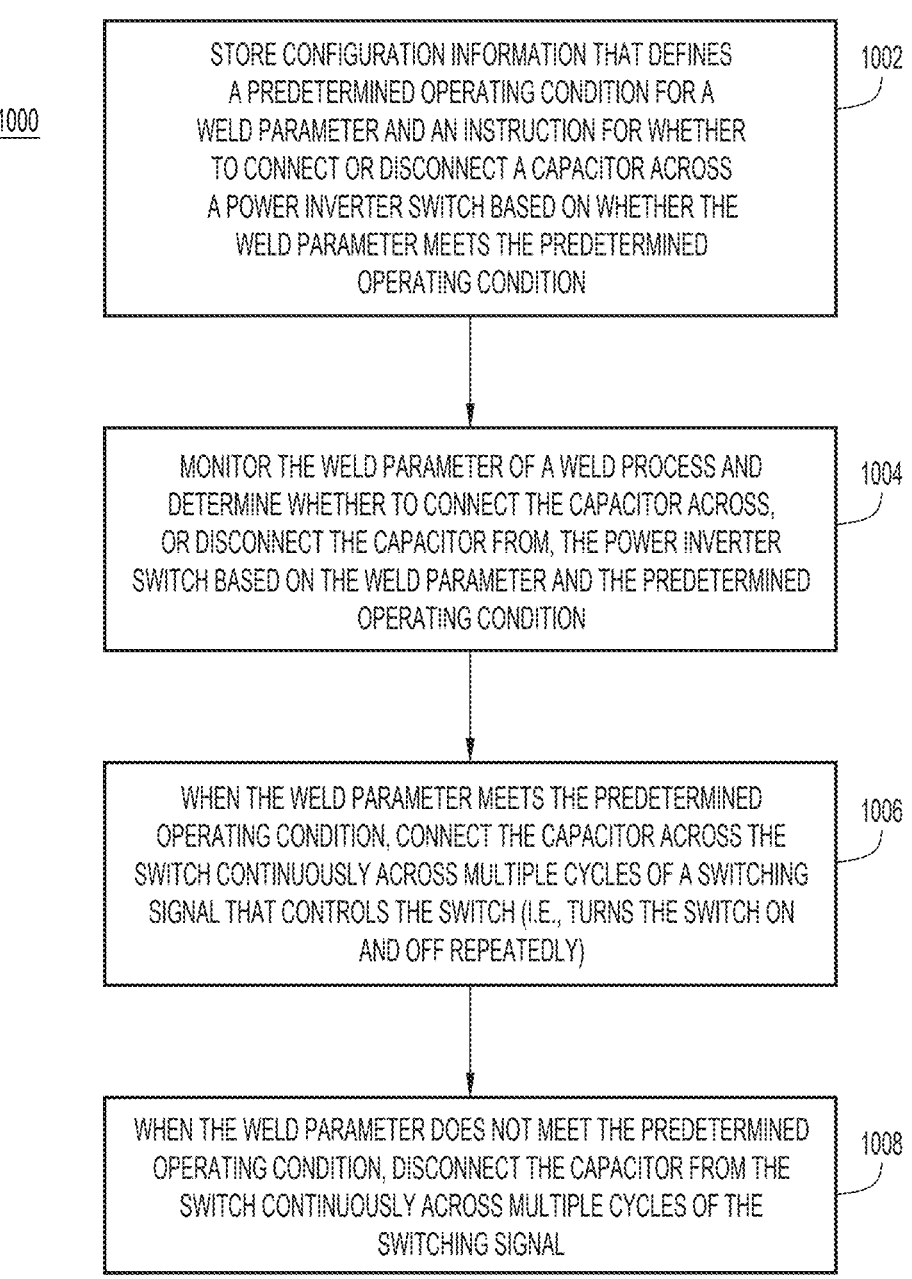

1000

STORE CONFIGURATION INFORMATION THAT DEFINES A PREDETERMINED OPERATING CONDITION FOR A WELD PARAMETER AND AN INSTRUCTION FOR WHETHER TO CONNECT OR DISCONNECT A CAPACITOR ACROSS A POWER INVERTER SWITCH BASED ON WHETHER THE WELD PARAMETER MEETS THE PREDETERMINED OPERATING CONDITION — 1002

MONITOR THE WELD PARAMETER OF A WELD PROCESS AND DETERMINE WHETHER TO CONNECT THE CAPACITOR ACROSS, OR DISCONNECT THE CAPACITOR FROM, THE POWER INVERTER SWITCH BASED ON THE WELD PARAMETER AND THE PREDETERMINED OPERATING CONDITION — 1004

WHEN THE WELD PARAMETER MEETS THE PREDETERMINED OPERATING CONDITION, CONNECT THE CAPACITOR ACROSS THE SWITCH CONTINUOUSLY ACROSS MULTIPLE CYCLES OF A SWITCHING SIGNAL THAT CONTROLS THE SWITCH (I.E., TURNS THE SWITCH ON AND OFF REPEATEDLY) — 1006

WHEN THE WELD PARAMETER DOES NOT MEET THE PREDETERMINED OPERATING CONDITION, DISCONNECT THE CAPACITOR FROM THE SWITCH CONTINUOUSLY ACROSS MULTIPLE CYCLES OF THE SWITCHING SIGNAL — 1008

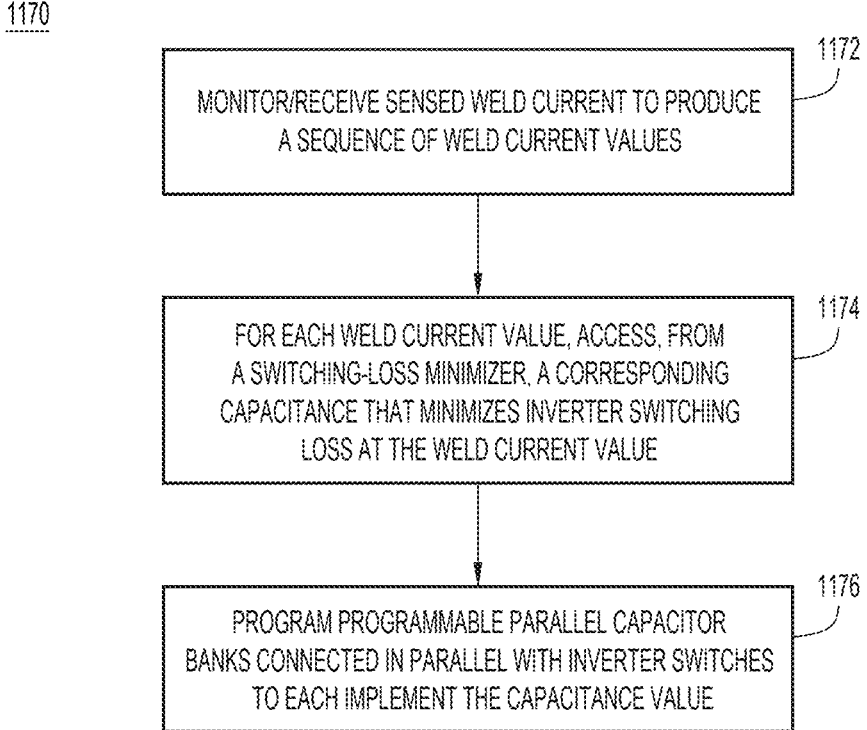

1172

MONITOR/RECEIVE SENSED WELD CURRENT TO PRODUCE
A SEQUENCE OF WELD CURRENT VALUES

1174

FOR EACH WELD CURRENT VALUE, ACCESS, FROM
A SWITCHING-LOSS MINIMIZER, A CORRESPONDING
CAPACITANCE THAT MINIMIZES INVERTER SWITCHING
LOSS AT THE WELD CURRENT VALUE

1176

PROGRAM PROGRAMMABLE PARALLEL CAPACITOR
BANKS CONNECTED IN PARALLEL WITH INVERTER SWITCHES
TO EACH IMPLEMENT THE CAPACITANCE VALUE

FIG.11C

MANIPULATION OF RESONANT ELEMENTS IN SWITCHING POWER SUPPLIES

TECHNICAL FIELD

The present disclosure relates to using parallel capacitors in inverters in welding power supplies.

BACKGROUND

A welding power supply may include a direct current (DC)-to-DC H-bridge inverter to generate current for a welding process. The H-bridge inverter includes a first leg of series-connected semiconductor switches connected to a first side of a transformer and a second leg of series-connected switches connected to a second side of the transformer. Pulse width modulated (PWM) switching signals cycle the switches ON and OFF to supply current to the transformer. To reduce switching losses, the H-bridge inverter may employ zero voltage switching (ZVS). To achieve ZVS, the H-bridge inverter may include capacitors connected across (i.e., in parallel with) the switches. The parallel capacitors and a parasitic inductance of the transformer or an external inductor form a resonant circuit that helps achieve ZVS. Conventional arrangements employ fixed parallel capacitors that are permanently connected across the switches and cannot adapt to changing operating conditions during a welding operation. This is disadvantageous under operating conditions in which the presence of the parallel capacitors degrades or hinders conversion efficiency of the H-bridge. Moreover, the conventional arrangements are limited to certain parallel capacitor configurations or topologies that do not yield maximum H-bridge performance.

BRIEF DESCRIPTION OF THE DRAWINGS

FIG. 10 is a flowchart of an example method of controlling switched capacitors of an inverter responsive to weld operating conditions of the weld system during a weld operation or process.

FIG. 11C is a flowchart of an example method of using a switching-loss minimizer to control programmable parallel capacitor banks to minimize inverter switching loss dynamically under varying loads during a welding operation.

DETAILED DESCRIPTION

Overview

In an embodiment, a system to generate weld power for a welding process comprises: a power supply including a power inverter having multiple switches to be controlled by respective ones of multiple switching signals such that each switch is alternately turned ON and OFF within each switching cycle of a respective one of the multiple switching signals, to supply a current to an output circuit of the power supply that is configured to convert the current to the weld power, wherein the power inverter includes a capacitor and a capacitor switch connected in series with each other and across a switch of the multiple switches; and a controller to monitor a weld parameter and control the capacitor switch to either connect the capacitor across, or disconnect the capacitor from, the switch continuously across multiple cycles of a respective one of the multiple switching signals, depending on whether the weld parameter meets a predetermined operating condition of the welding process.

In another embodiment, a system to generate weld power for a welding process comprises: a transformer; a power inverter having multiple switches that include a first upper switch and a first lower switch connected in series with each other and to the transformer, and a second upper switch and a second lower switch connected in series with each other and to the transformer, wherein the multiple switches are each configured to be switched ON and OFF cyclically responsive to respective ones of multiple switching signals to supply current to the transformer, which is configured to transform the current to a transformed current indicative of the weld power; and capacitors connected in parallel with (i) only the first upper switch and the second upper switch, or (ii) only the first lower switch and the second lower switch.

In yet another embodiment, a system to generate weld power for a welding process comprises: a transformer; a power inverter having: multiple switches configured to be switched ON and OFF by respective ones of multiple switching signals to supply a current to the transformer, which is configured to transform the current to a transformed current indicative of the weld power; and a capacitor bank having parallel capacitors configured to be connected across, or disconnected from, a switch of the multiple switches responsive to multiple control signals, in order to connect different combinations of the parallel capacitors across the switch and achieve different capacitances across the switch.

EXAMPLE EMBODIMENTS

Figure 1:
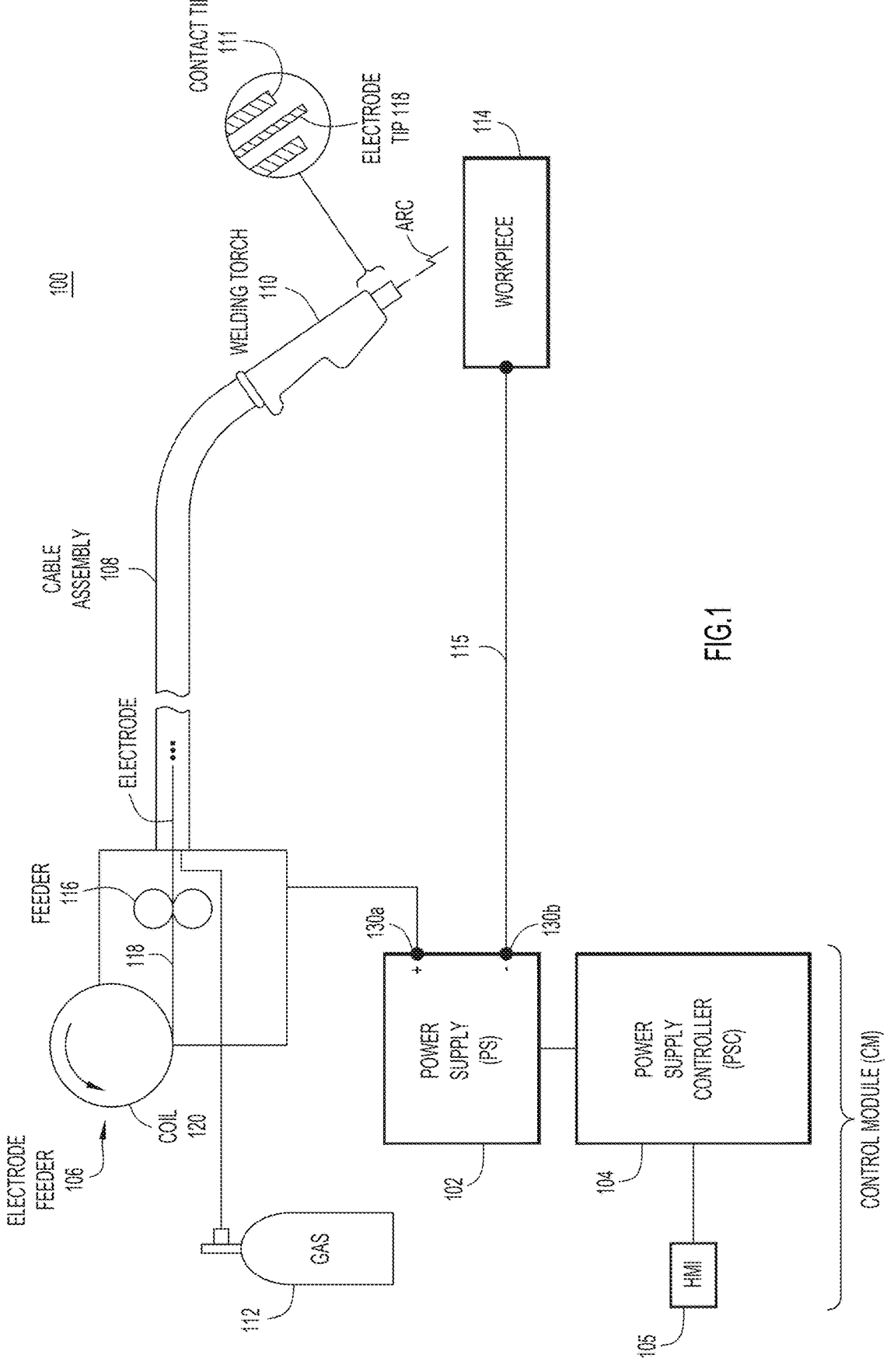
FIG. 1 is an illustration of an example metal inert gas (MIG)/metal active gas (MAG) welding system, in which zero voltage switching (ZVS) power supply embodiments may be implemented.

With reference to FIG. 1, there is an illustration of an example metal inert gas (MIG)/metal active gas (MAG)

welding system 100, in which zero voltage switching (ZVS) power supply embodiments may be implemented. The embodiments are presented in the context of MIG/MAG welding by way of example only. It is understood that the embodiments may be employed generally in any known or hereafter developed welding environments, such as, but not limited to, tungsten inert gas (TIG) welding, flux cored arc welding (FCAW), shielded metal arc welding (SMAW) or stick welding, submerged arc welding (SAW), and so on. Additionally, the embodiments may be employed equally in an arc cutting apparatus. In the example shown in FIG. 1, welding system 100 includes: a power supply 102; a power supply controller (PSC) 104 coupled to and configured to control the power supply; a human machine interface (HMI) 105 coupled to the PSC and through which a human interacts with and controls the welding system; a wire electrode feeder 106 coupled to the power supply; a cable assembly 108 coupled to the wire electrode feeder 106; a torch 110 coupled to the cable assembly 108 and having a sturdy metal contact tip 111 that extends from an end of the torch 110; a gas container 112 coupled to the cable assembly 108; and a workpiece 114 coupled to the power supply through at least a return path/cable 115. PSC 104 and HMI 105 collectively form a control module CM. In the ensuing description, the terms "weld" and "welding" are synonymous and interchangeable. In the context of arc welding, torch 110 may be referred to as a "welding torch" or "welding gun."

Wire electrode feeder 106 includes a feeder 116 to feed a consumable electrode from a coiled wire electrode 120 through cable assembly 108 and through contact tip 111 of torch 110, which is in electrical contact with the electrode. Under control of PSC 104, power supply 102 generates weld power that drives the welding process/operation. In welding operations that involve a pulsed or periodic waveform, the weld power typically includes a series of weld current pulses. Power supply 102 provides the weld power from an output terminal 130a of the power supply to the wire electrode, through feeder 116, cable assembly 108, and torch 110, while the cable assembly 108 also delivers a shielding gas from gas container 112 to the torch. Return path/cable 115 provides an electrical return path from workpiece 114 to an input terminal 130b of power supply 102. The aforementioned components comprise a circuit path or weld circuit from output terminal 130a to input terminal 130b of power supply 102, through wire electrode feeder 106, cable assembly 108, torch 110, workpiece 114, and return path/cable 115.

During a welding operation, an electrode tip 118 of the electrode is brought into contact or near contact with workpiece 114, and the weld power (i.e., current and voltage) supplied by power supply 102 to the torch 110 creates an arc between workpiece 114 and electrode tip 118 extending through the contact tip. To control the welding process, PSC 104 controls power supply 102 to generate the weld power (e.g., current) at a desired level for the welding process, based on feedback in the form of measurements of the current and voltage (e.g., arc voltage) supplied by the power supply to the welding process. The measurements may be produced by current and voltage sense points in power supply 102 and/or at sense points that are remote from the power supply, such as in cable assembly 108 or torch 110. When welding system 100 is operated in a pulsed GMAW mode, power supply 102 supplies to the torch 110 a current waveform that periodically fluctuates between a low, background current, and a peak current level. Each current pulse begins with an upslope from the background current level to the peak current level and ends with a slope down from the peak current level. As described in greater detail below, the shape, duration, energy, and frequency of each current pulse are adjustable according to primary and secondary current waveform parameters that are controllable by power supply 102.

Figure 2:
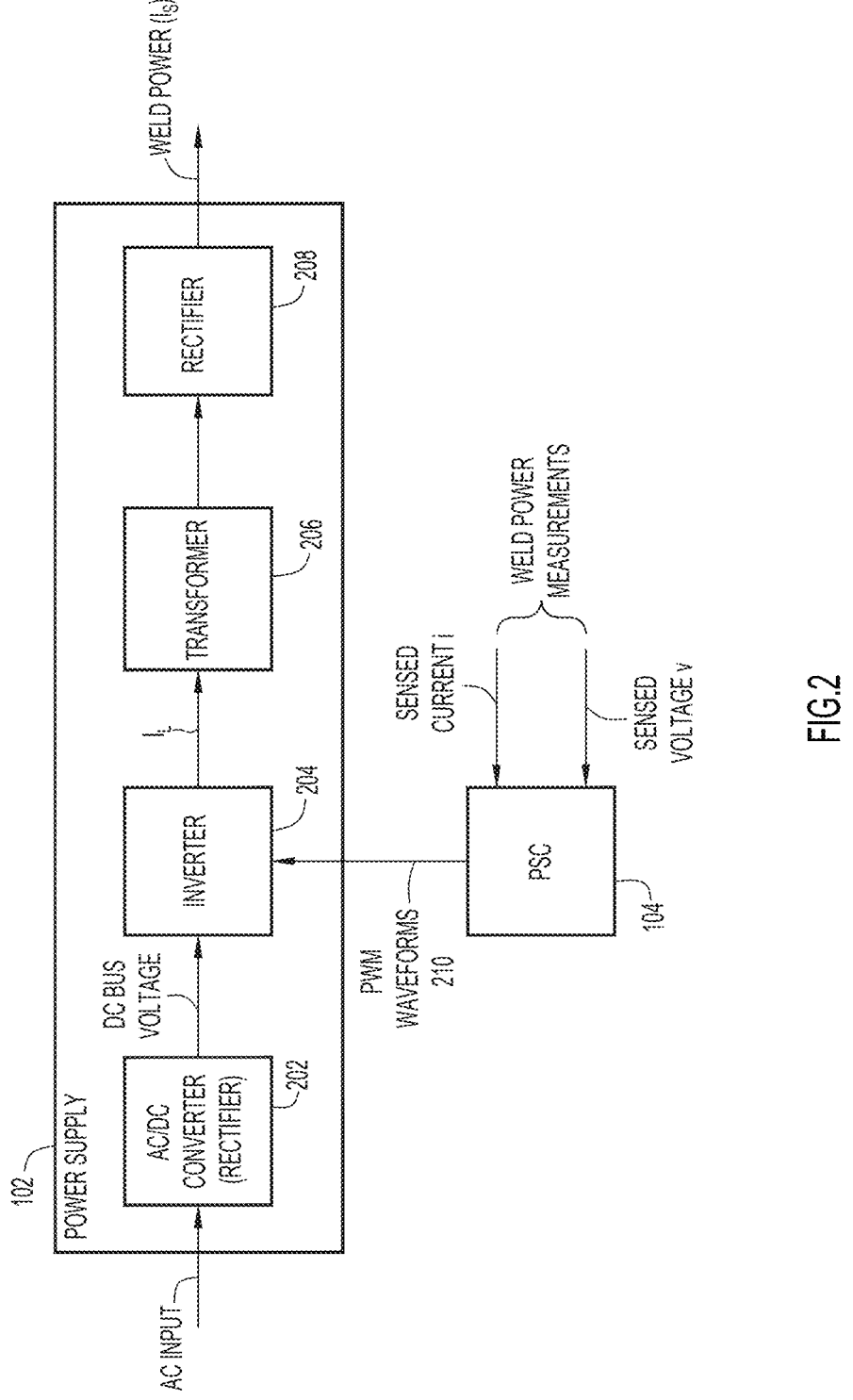
FIG. 2 is a block diagram of an example power supply with a power supply controller (PSC) of the welding system, according to an embodiment.

FIG. 2 is a block diagram of an example power supply 102 with PSC 104, according to an embodiment. Power supply 102 includes an AC/DC converter 202 to receive AC input power (e.g., from AC mains or a generator), a power inverter (referred to simply as an "inverter") 204, a high-frequency transformer 206, and a rectifier 208 coupled to one another. AC/DC converter 202 includes, for example, a diode rectifier to convert the AC input power to a constant, rectified DC voltage (also referred to as a DC "bus" voltage), and provides the DC bus voltage to an input of inverter 204. Under control of PSC 104, inverter 204, transformer 206, and rectifier 208 collectively operate as a weld process regulator (also referred to as a power supply "output circuit") to convert the DC bus voltage to a desired weld power supplied by power supply 102 for a welding operation.

Inverter 204 comprises a set of high-speed semiconductor switching devices (i.e., power switches) that are pulse width modulated (i.e., switched on and off at a switching frequency) responsive to pulse width modulation (PWM) waveforms 210 (also referred to as "PWM signals"), generated by PSC 104 and applied to control terminals of the switching devices, to convert the DC bus voltage to an AC (power) signal or waveform including a voltage and a primary current $I_L$ that flows into transformer 206. Such operation is referred to as "PWM operation" of inverter 204. Inverter 204 may include a four-quadrant inverter, such as an H-bridge inverter, for example. In other examples, other types of inverters may be employed. Example switching frequencies may be in a range from 1 kHz-100 kHz, although other switching frequencies above and below this range may be used. Inverter 204 supplies the AC signal to transformer 206. Transformer 206 converts the voltage and current of the AC signal from inverter 204 to a transformed AC signal having desired levels of a voltage and a secondary current Is for the welding operation, and supplies the transformed AC signal to rectifier 208. The transformed AC signal can be considered to be indicative of, or to form the basis of, the weld power. Rectifier 208 rectifies the transformed AC signal to produce the weld power and supplies the same to the welding process.

Welding system 100 includes a current sense point to provide a sensed or measured current i to PSC 104. Current i is indicative of the weld current (and the weld power) supplied to weld torch 110 during a weld operation and when welding system 100 is idle and not actively engaged in the welding operation. Welding system 100 includes a voltage sense point to provide a sensed or measured voltage v to PSC 104. Voltage v is indicative of the weld voltage (and the weld power) supplied to weld torch 110 during a weld operation and when power supply is welding system 100 is idle and not actively engaged in the welding operation. The current and voltage sense points may be located in or near the sequential stages of power supply 102, or may be implemented remotely from the power supply. Together, current i and voltage v represent measurements of weld power supplied by power supply 102 to torch 110 for a welding process. That is, together, current i and voltage v represent weld power measurements. To control the weld power generated by power supply 102, PSC 104 generates and controls (e.g., dynamically adjusts) PWM waveforms 210 applied to inverter 204 based at least in part on the weld power measurements. For example, PSC 104 may increase duty cycles and thus on-times of PWM waveforms 210 applied to inverter 204 to increase the weld power, and vice versa. In this way, power supply 102 and PSC 104 implement a feedback control loop to control PWM waveforms 210 based on current i and voltage v.

Figure 3A:
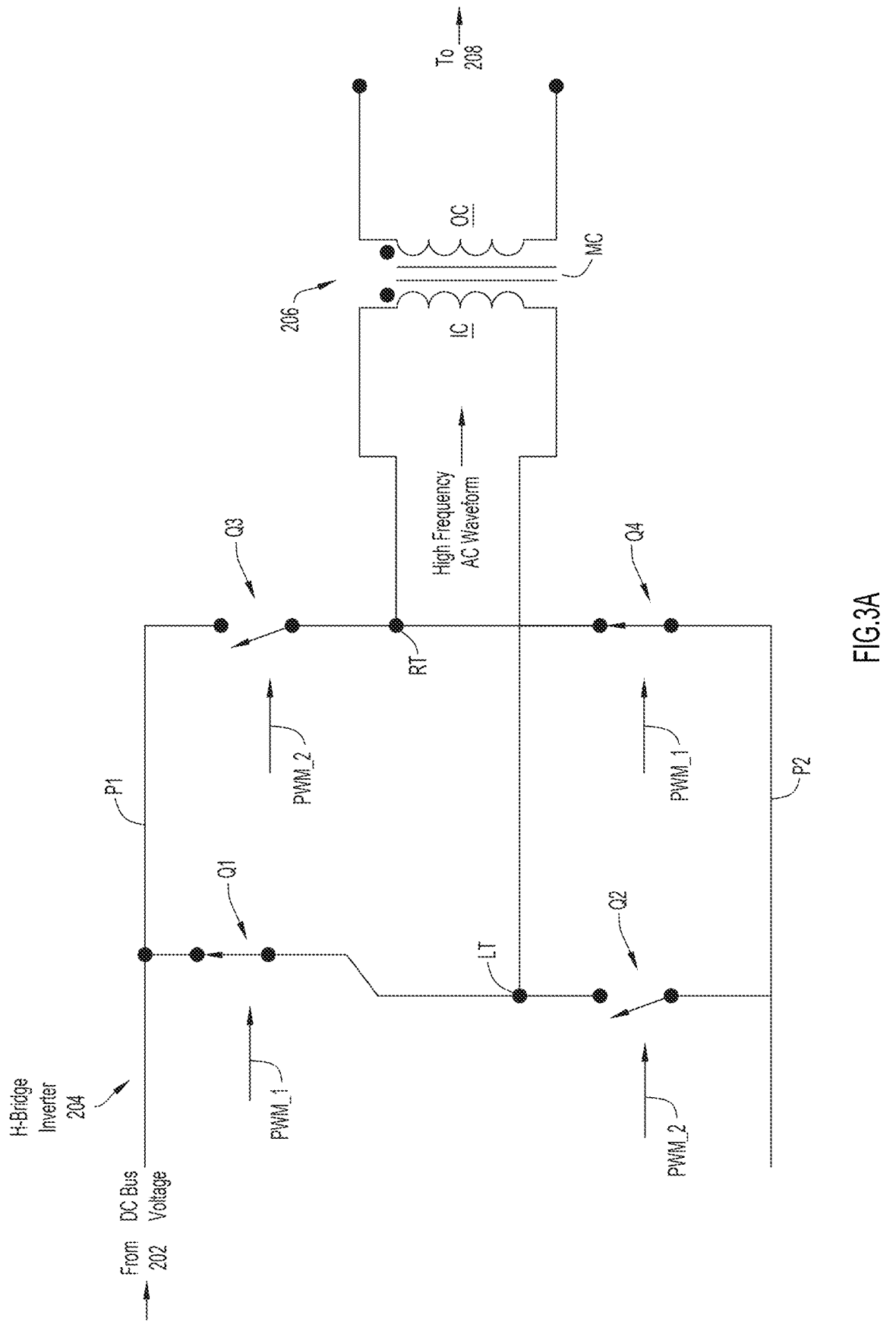
FIG. 3A is a simplified circuit diagram of an inverter and a transformer of the power supply according to an embodiment.

FIG. 3A is a simplified circuit diagram of inverter 204 and transformer 206. Transformer 206 includes an input coil IC coupled to an output of inverter 204, an output coil OC coupled to an input of rectifier 208 and electrically isolated from the input coil, and a magnetic core MC configured to magnetically couple the input coil IC to the output coil OC.

Inverter 204 includes a four-quadrant inverter, such as an H-bridge inverter (also referred to as a "full-bridge inverter"), for example. Inverter 204 has input voltage rails (also referred to as "input power rails"), including an upper voltage rail P1 and a lower voltage rail P2 (also referred to simply as voltage rails P1 and P2), to receive the DC bus voltage generated by AC/DC converter 202. Inverter 204 also includes a set of high-frequency semiconductor (current) switches Q1-Q4 (more generally referred to as "power switches" or simply "switches") coupled to the voltage rails and arranged in an H configuration. In an example, switches Q1, Q2, Q3, and Q4 correspond to first, second, third, and fourth quadrants of the four-quadrant inverter. More specifically, inverter 204 includes (i) upper left switch Q1 and lower left switch Q2 connected in series with each other between voltage rails P1 and P2 to form a first/left leg of the inverter, and (ii) upper right switch Q3 and lower right switch Q4 connected in series with each other between the voltage rails to form a second/right leg of the inverter. Switches Q1 and Q2 are connected to each other at a left node LT, and switches Q3 and Q4 are connected to each other at a right node RT. Nodes LT, RT are respectively connected to opposing sides of input coil IC of transformer 206, while opposing sides of output coil OC of the transformer are coupled to rectifier 208. Switches Q1-Q4 (more generally, the first through the fourth quadrants) are controlled (i.e., turned ON or closed and turned OFF or opened) responsive to PWM signals or waveforms 210 generated by PSC 104 and applied to respective control terminals of the switches. PWM waveforms 210 are typically configured as periodic square wave pulses, although other waveforms are possible.

In the example of FIG. 3A, PWM waveforms 210 have a first configuration to activate alternate diagonal switch pairs of inverter 204 in a complementary fashion, as is now described. PWM waveforms 210 include PWM waveforms PWM_1 and PWM_2 (referred to simply as "PWM_1" and "PWM_2"), which respectively control first diagonal switch pair Q1, Q4 (e.g., the diagonal first and fourth quadrants) (together) and second diagonal switch pair Q2, Q3 (e.g., the diagonal second and third quadrants) (together). ON/OFF (e.g., high/low) states of PWM_1 (or PWM_2) turn ON/OFF first diagonal switch pair Q1, Q4 (or second diagonal switch pair Q2, Q3) to supply/not supply current from voltage rails (P1, P2) to input coil IC of transformer 206 through left node LT (or through right node RT). In general, PWM_1 and PWM_2 alternately turn ON and OFF with respect to each other to alternately energize and de-energize diagonal switch pairs Q1, Q4 (e.g., the diagonal first and fourth quadrants) and Q2, Q3 (e.g., the diagonal second and third quadrants) to supply current to input coil IC of transformer 206 alternately via terminals LT and RT. During each on-time (i.e., pulse) of PWM_1, and during each on-time of PWM_2, inverter 204 supplies current to transformer 206.

The example of FIG. 3A shows a PWM cycle in which switches Q1, Q4 are ON responsive to PWM_1, and switches Q2, Q3 are OFF responsive to PWM_2, in which case only node LT supplies current to transformer 206. A subsequent PWM cycle reverses the configuration. Thus, PWM_2 causes diagonal switch pair Q2, Q3 to be turned ON and OFF together complementarily (i.e., in a complementary fashion) to diagonal switch pair Q1, Q4. PSC 104 controls the PWM frequency, period, duty cycle, and on-time of each of PWM waveforms PWM_1 and PWM_2 to control an overall or composite PWM frequency, period, duty cycle, and on-time of the current supplied to transformer 206. The magnitude and frequency of the AC signal generated by inverter 204, and correspondingly the magnitude and frequency of the current and voltage of the weld power produced by power supply 102, is controlled responsive to the PWM waveforms.

In an example, each switch Qi may be implemented as a switching transistor, such as an insulated gate bipolar transistor (IGBT) having an emitter-collector current path that is turned ON or OFF responsive to a voltage applied to a gate (i.e., the control terminal) of the IGBT, for example. Alternatively, each switch Qi may be implemented as a field effect transistor (FET) (e.g., a metal oxide semiconductor (MOS) FET (MOSFET)) having a source-drain current path that is turned ON or OFF responsive to a voltage applied to a gate of the FET, for example. Each switch Qi may also include an internal diode that is connected in parallel with the controlled current path of the switch. Other types of power switches may be used, as would be appreciated by one of ordinary skill in the relevant arts.

Figure 3B:
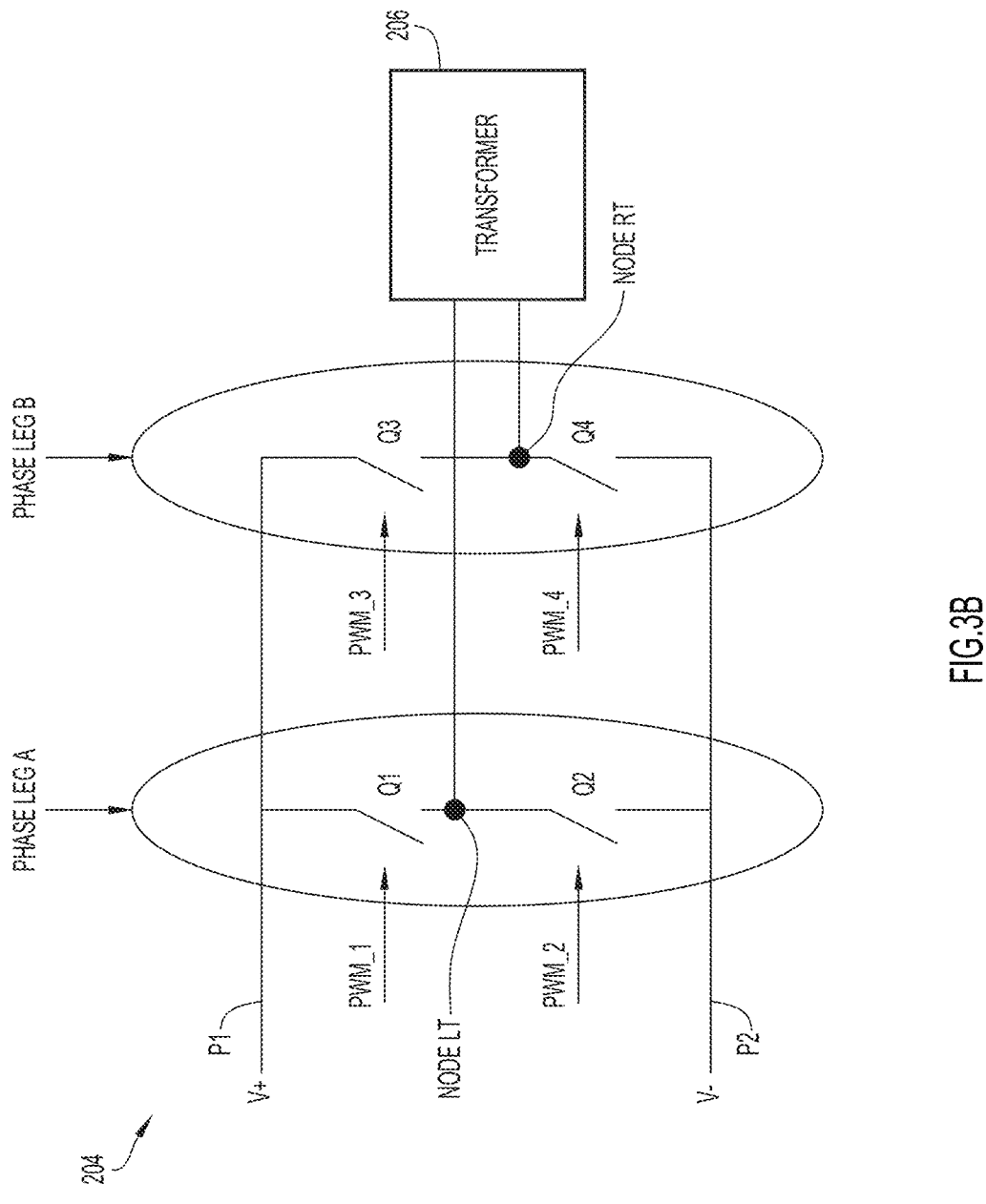
FIG. 3B is a simplified circuit diagram of the inverter and the transformer of the power supply according to another embodiment.

FIG. 3B is a simplified circuit diagram of inverter 204 (and transformer 206) in which PWM waveforms 210 have a second configuration that controls the inverter to operate as a phase-shifted full bridge, as is now described. PWM waveforms 210 include PWM waveforms PWM_1, PWM_2, PWM_3, and PWM_4 to control respective switches Q1, Q2, Q3, and Q4, individually. In the example of FIG. 3B, PWM waveforms 210 control phase shifts of and between a phase leg A (i.e., the left leg, which includes switches Q1, Q2) and a phase leg B (i.e., the right leg, which includes switches Q3, Q4). Each phase leg has an example duty cycle of 50% resulting from node voltages at nodes LT, RT, as shown in FIGS. 3C and 3D.

Figure 3C:
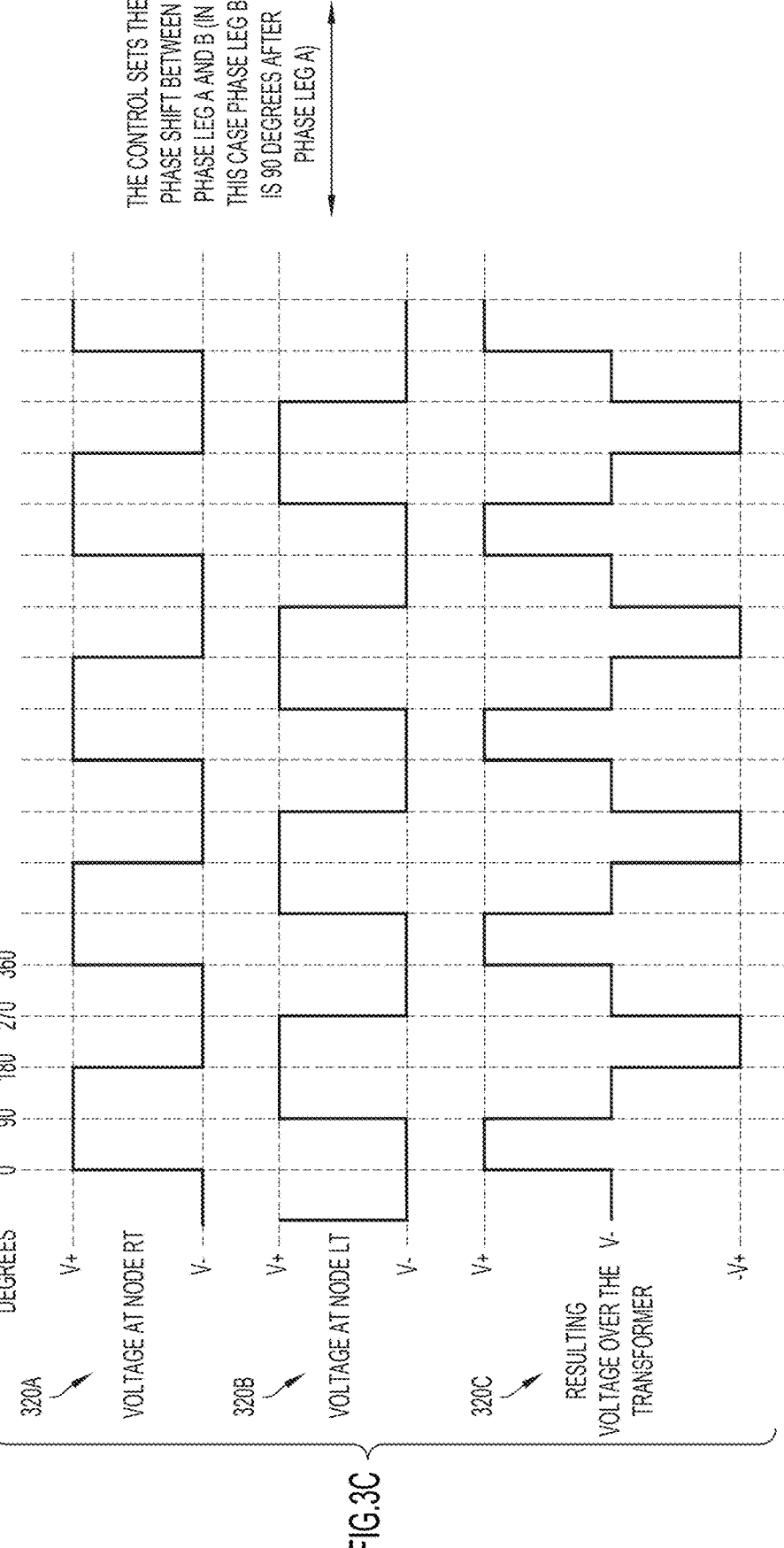
FIG. 3C shows example waveforms for voltages for a first working point of control of the inverter of FIG. 3B.

FIG. 3C shows example waveforms 320A, 320B, and 320C for voltages at node LT, node RT, and over transformer 206 as a result of the node voltages, for a first working point of control of inverter 204 in FIG. 3B.

Figure 3D:
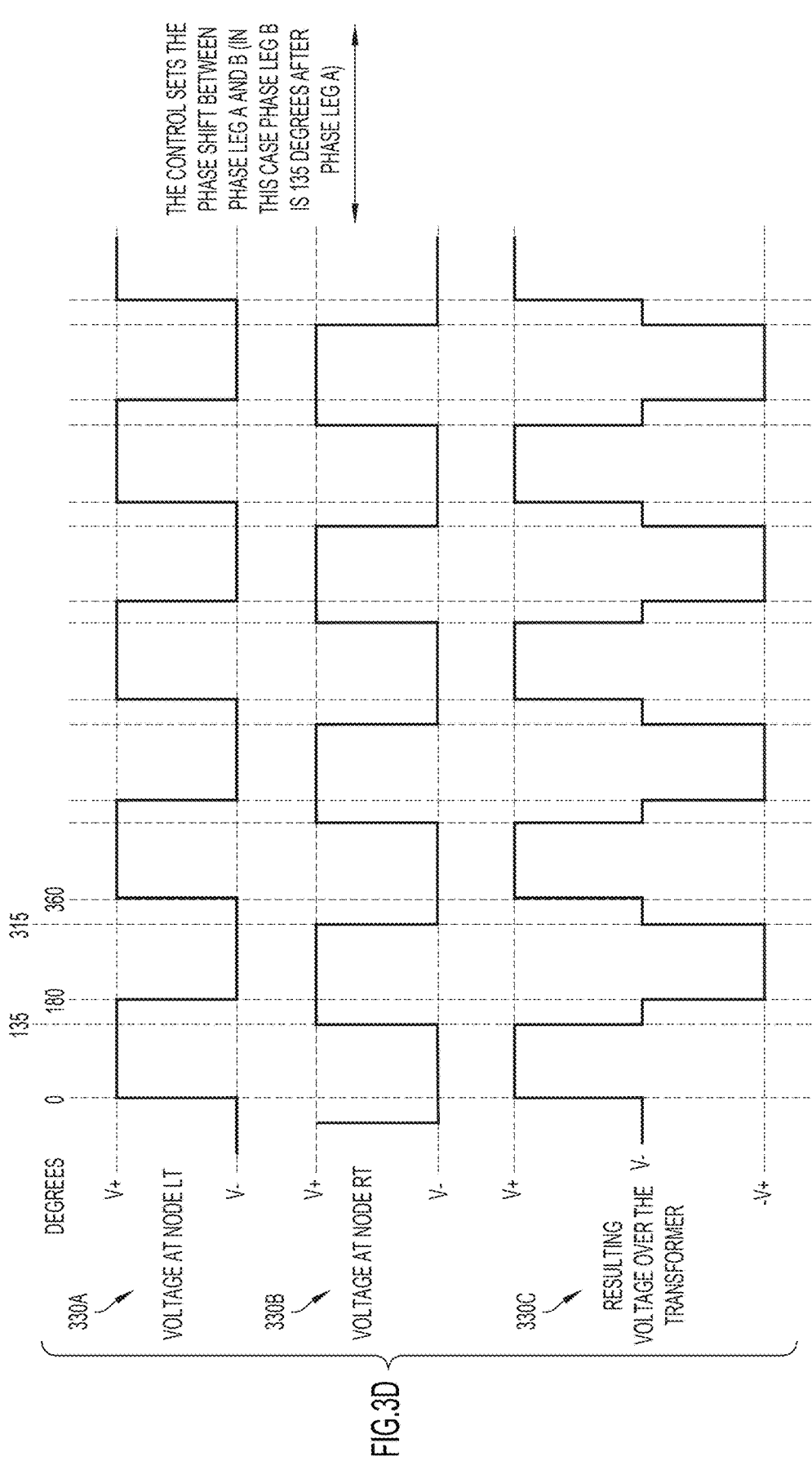
FIG. 3D shows example waveforms for voltages for a second working point of control of the inverter of FIG. 3B.

FIG. 3D shows example waveforms 330A, 330B, and 330C for voltages at node LT, node RT, and over transformer 206 as a result of the node voltages, for a second working point of control of inverter 204 in FIG. 3B.

The embodiments presented below in connection with FIGS. 4-11C are directed to ZVS inverters that employ various arrangements of parallel capacitors to achieve ZVS and overcome disadvantages of conventional ZVS techniques. Other advantages of the ZVS inverters will be apparent from the ensuing description. The embodiments are described in the context of ZVS by way of example only. It is understood that the embodiments apply equally well to contexts other than ZVS, and that the ZVS aspect is optional. In the example inverters of FIGS. 4-9, upper voltage rail P1 applies a positive DC voltage and lower voltage rail P2 applies a negative voltage, or is ground. It is understood that in each of the example inverters, the voltage senses of upper voltage rail P1 and lower voltage rail P2 may be reversed to apply negative and positive DC voltages, respectively.

Figure 4:
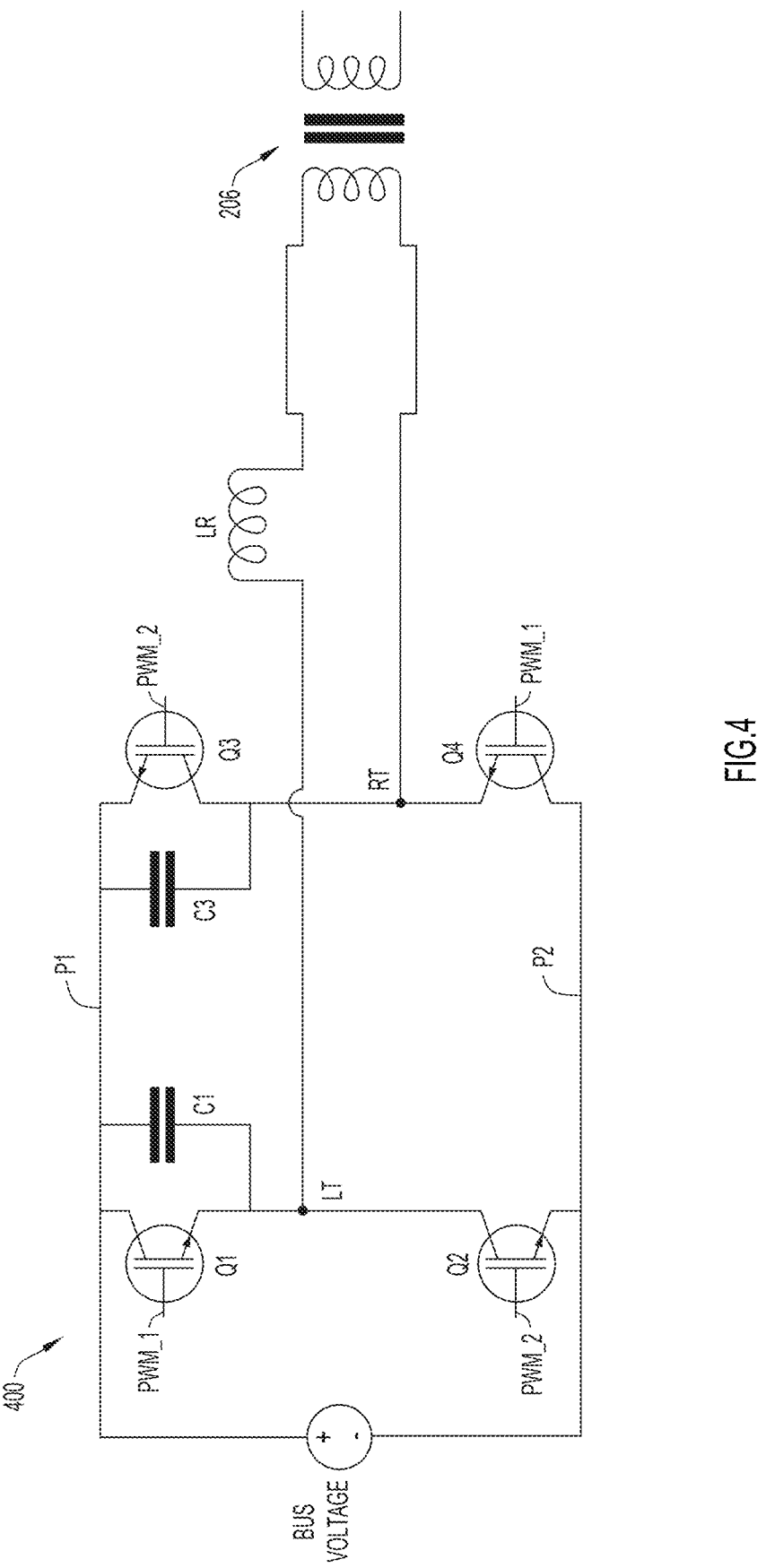
FIG. 4 shows an example inverter with upper fixed parallel capacitors used as resonant elements for ZVS.

FIG. 4 shows an example inverter 400 with fixed parallel capacitors used as resonant elements for ZVS. Inverter 400 supplies current to transformer 206. As shown in FIG. 4, transformer 206 introduces parasitic inductance LR that form a resonant circuit with the parallel capacitors to achieve the ZVS. In an alternative arrangement, an external (resonant) inductor (also denoted "LR") may be connected in series with the primary winding of transformer 206 to form the resonant circuit. Inverter 400 includes only upper capacitors C1, C3 connected across (i.e., in parallel with) only upper switches Q1, Q3, respectively; there are no capacitors connected across lower switches Q2, Q4. Advantages of using only upper capacitors include reduced cost and circuit size. Capacitor C1 has a first side and a second side opposing the first side (i.e., opposing terminals) respectively connected to upper voltage rail P1 and node LT, such that the capacitor is connected across only switch Q1. Capacitor C3 has its opposing terminals respectively connected to upper voltage rail P1 and node RT, such that the capacitor is connected across only switch Q3. The capacitors may be internal or inherent (i.e., intrinsic) to the switches, or may be discrete capacitors that are external to the switches. As described herein, a capacitor Ci that has opposing terminals electrically connected to opposing sides of a current path (e.g., a source-drain or emitter-collector current path) of a switch Qi is considered to be connected in parallel with the switch. This includes arrangements in which a terminal of the capacitor is connected to a side of the current path through a capacitor switch, as described below in connection with FIG. 5-9.

Figure 5:
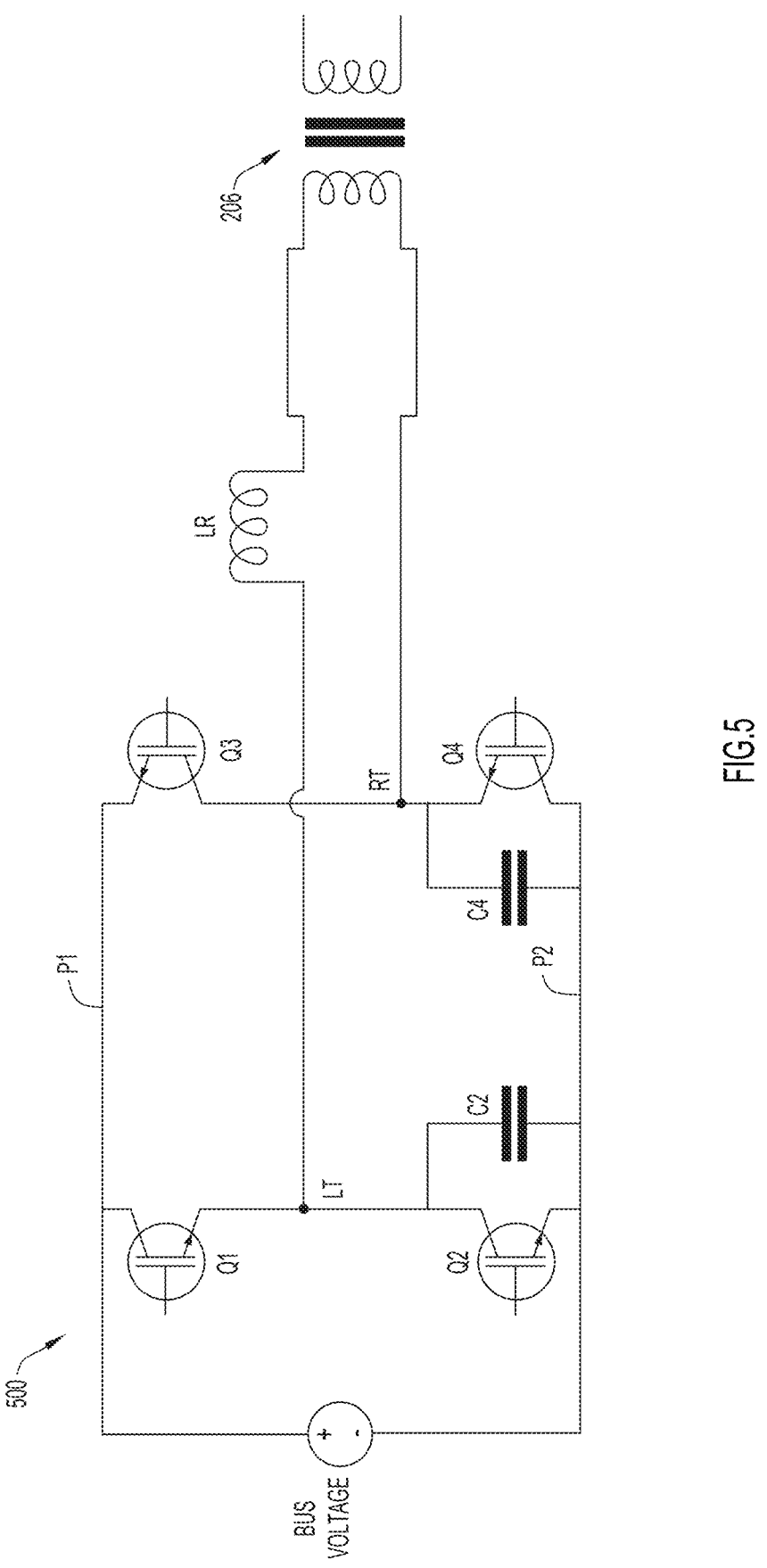
FIG. 5 shows an example inverter with lower fixed parallel capacitors used as resonant elements for ZVS.

In FIGS. 5-9, reference labels for PWM waveforms 210 are omitted for purposes of illustrative clarity, only. FIG. 5 shows an example inverter 500 with fixed parallel capacitor used as resonant elements for ZVS. Inverter 500 includes only lower capacitors C2, C4 connected across only lower switches Q2, Q4; there are no capacitors connected across upper switches Q1, Q3. More specifically, capacitor C2 has its opposing terminals respectively connected to negative lower voltage rail P2 and node LT, such that the capacitor is connected across only switch Q2. Similarly, capacitor C4 has its opposing terminals respectively connected to lower voltage rail P2 and node RT, such that the capacitor is connected across only switch Q4. Advantages of using only lower capacitors include reduced cost and circuit size. Additionally, use of a common ground reference simplifies switch control and drive circuits.

Figure 6A:
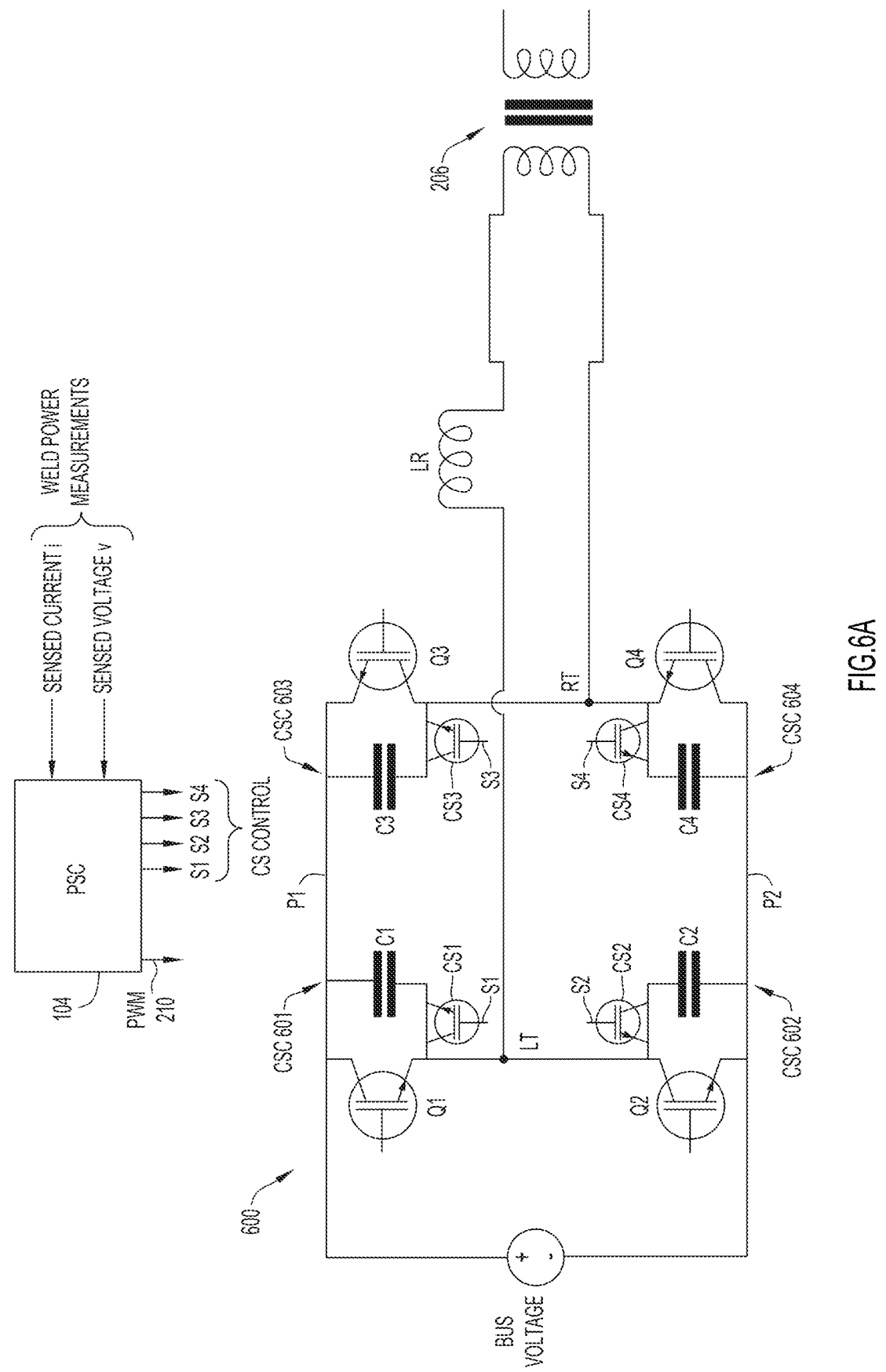
FIG. 6A shows an example inverter with switched parallel capacitors selectively used as resonant elements for ZVS.

FIG. 6A shows an example inverter 600 with "switchable" or "switched" parallel capacitors selectively used as resonant elements for ZVS under control of PSC 104. Inverter 600 includes capacitors C1, C2, C3, and C4 selectively connected in parallel with, or disconnected from, switches Q1, Q2, Q3, and Q4, under control of PSC 104. A capacitor that is not connected in parallel with a corresponding switch is said to be disconnected from the switch. For example, the capacitor is disconnected from the switch when one of the opposing terminals of the capacitor is not electrically connected to one of the sides of current path of the switch. Inverter 600 includes parallel capacitor switch circuits (CSCs) 601, 602, 603, and 604 respectively connected across only switches Q1, Q2, Q3, and Q4.

CSC 601 includes a capacitor C1 and a capacitor switch CS1 connected in series with each other and together across switch Q1. Series-connected capacitor C1 and capacitor switch CS1 are connected from node LT to upper voltage rail P1 in a first positional order in which the capacitor is connected to upper voltage rail P1, and the capacitor switch is connected to node LT. In other words, capacitor C1 has its opposing terminals respectively connected to upper voltage rail P1 and capacitor switch CS1, and the capacitor switch has its opposing terminals respectively connected to capacitor C1 node LT.

Capacitor switch CS1 is controlled responsive to a control signal S1 generated by PSC 104 and applied to a control terminal (e.g., a gate) of the capacitor switch. Depending on a state of the control signal S1 (e.g., logic 1 or 0), the control signal turns ON (i.e., closes) or turns OFF (i.e., opens) capacitor switch CS1. When turned ON, capacitor switch CS1 connects capacitor C1 to node LT and thereby across switch Q1. On the other hand, when turned OFF capacitor switch CS1 disconnects capacitor C1 from node LT and thereby disconnects the capacitor from switch Q1.

CSC 602 includes capacitor C2 and a capacitor switch CS2 connected in series with each other and together across switch Q2. Capacitor C2 has its opposing terminals respectively connected to lower voltage rail P1 and capacitor switch CS2, and the capacitor switch has its opposing terminals respectively connected to capacitor C2 node LT. Capacitor switch CS2 is controlled responsive to a control signal S2 generated by PSC 104 and applied to a control terminal of the capacitor switch to connect capacitor C2 across switch Q2, or disconnect capacitor C2 from switch Q2.

CSC 603 includes capacitor C3 and a capacitor switch CS3 connected in series with each other and together across switch Q3. Capacitor C3 has its opposing terminals respectively connected to upper voltage rail P1 and capacitor switch CS3, and the capacitor switch has its opposing terminals respectively connected to capacitor C3 node RT. Capacitor switch CS3 is controlled responsive to a control signal S3 generated by PSC 104 and applied to a control terminal of the capacitor switch to connect capacitor C3 across switch Q3, or disconnect capacitor C3 from switch Q3.

CSC 604 includes capacitor C4 and a capacitor switch CS4 connected in series with each other and together across switch Q4. Capacitor C4 has its opposing terminals respectively connected to upper voltage rail P1 and capacitor switch CS4, and the capacitor switch has its opposing terminals respectively connected to capacitor C4 node RT. Capacitor switch CS4 is controlled responsive to a control signal S4 generated by PSC 104 and applied to a control terminal of the capacitor switch to connect capacitor C4 across switch Q4, or disconnect capacitor C4 from switch Q4.

Each capacitor switch CSi may include a FET that has a source-drain current path connected in series with capacitor Ci and a gate to receive control signal Si to turn ON or turn OFF the current, and thereby connect capacitor Ci in parallel with switch Qi, or disconnect capacitor Ci from switch Qi. Other types of capacitor switches may be used.

Figure 7:
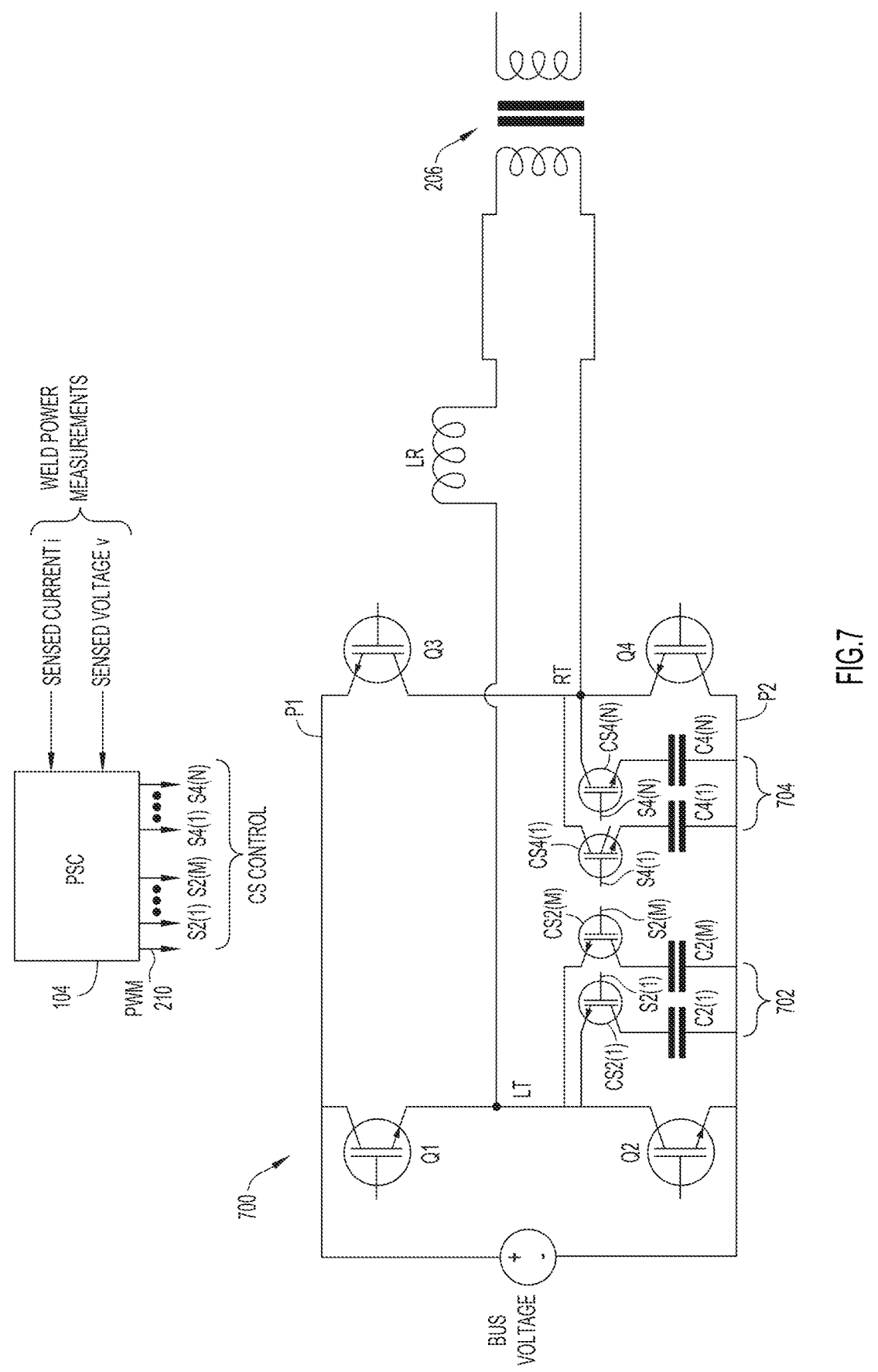
FIG. 7 shows an example inverter with programmable parallel capacitor banks.
Figure 8:
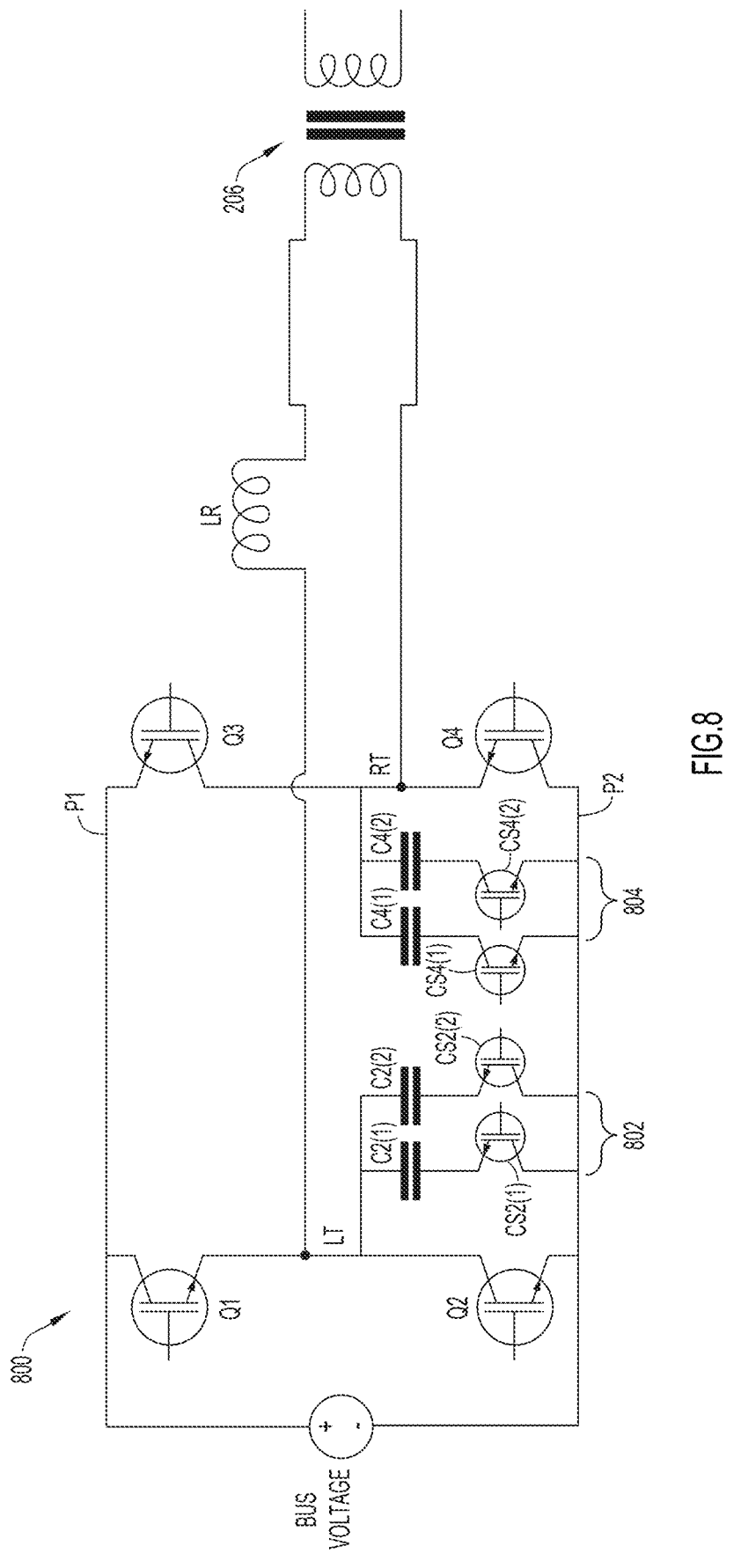
FIG. 8 shows another example inverter with programmable capacitor banks.

In the example of FIG. 6A, a given series-connected capacitor and capacitor switch are connected in the first positional order in which the capacitor is connected to one of voltage rails P1, P2 and the capacitor switch is connected to one of as nodes LT, RT. In another example, the series-connected capacitor and capacitor switch may be connected in a second positional order in which positions of the capacitor and the capacitor switch are reversed relative to their positions in the first positional order. In the second positional order, the capacitor switch (not the capacitor) is connected to one of voltage rails P1, P2, and the capacitor (not the capacitor switch) is connected to one of nodes LT, RT. An example of the second positional order of the series-connected capacitor and capacitor switch is shown in FIG. 8, described after FIG. 7 is described.

PSC 104 independently asserts each control signal Si to selectively connect each capacitor Ci across, or disconnect each capacitor Ci from, each switch Qi, where i is 1, 2, 3, and 4. Control signals S1-S4 (collectively referred to as "CS Control" in FIG. 6A) may form a binary code or word of multiple logic bits that respectively control capacitor switches CS1-CS4 to respectively connect capacitors C1-C4 across, or disconnect the capacitors from, switches Q1-Q4, respectively, depending on respective logic levels of the logic bits.

At any given time, PSC 104 may generate each control signal Si independently of the other control signals, and independently of PWM waveforms 210, to connect each capacitor Ci across each switch Qi, or disconnect each capacitor Ci from each switch Qi, individually and independently of whether other capacitors are connected across, or disconnected from, the other switches. For example, PSC 104 may concurrently assert/generate control signals S1-S4 such that all capacitors C1-C4 are connected across all switches Q1-Q4, or all capacitors C1-C4 are disconnected from all switches Q1-Q4. Alternatively, PSC 104 may generate control signals S1-S4 such that some (e.g., one or more), but not all, of capacitors C1-C4 are connected across switches Q1-Q4.

Figure 6B:
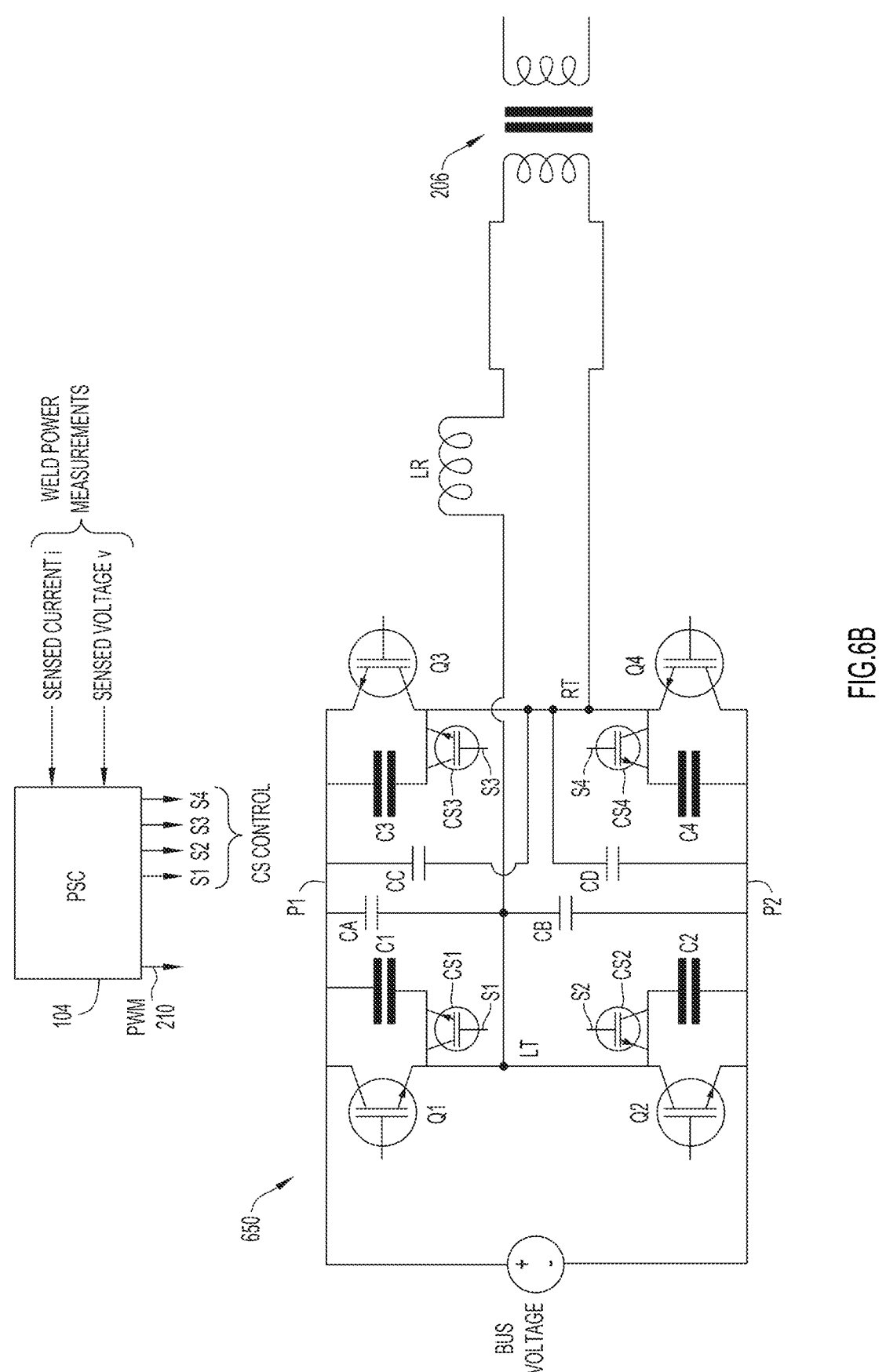
FIG. 6B shows an example inverter with switched parallel capacitors and parallel capacitors that are not switched.

FIG. 6B shows an example inverter 650 with switched parallel capacitors similar to inverter 600 of FIG. 6A, but that further includes parallel capacitors that are not switched. Specifically, inverter 650 includes a capacitor CA connected from upper voltage rail P1 to node LT to be always connected across switch Q1, a capacitor CB connected from lower voltage rail P2 to node LT to be always connected across switch Q2, a capacitor CC connected from upper voltage rail P1 to node RT to be always connected across switch Q3, and a capacitor CD connected from lower voltage rail P2 to node RT to be always connected across switch Q4. One or more of capacitors CA-CD may be omitted.

FIG. 7 shows an example inverter 700 with programmable parallel capacitor banks (also referred to as "capacitor banks") that operate under control of PSC 104. More specifically, inverter 700 includes a programmable parallel capacitor bank 702 connected across switch Q2 and a programmable parallel capacitor bank 704 connected across switch Q4. Programmable parallel capacitor bank 702 applies different levels of capacitance across switch Q2 under control of PSC 104. Programmable parallel capacitor bank 702 includes parallel capacitors C2(1)-C2(M) respectively connected in series with parallel capacitor switches CS2(1)-CS2(M) (where M>1) from node LT to lower voltage rail P2 in the first positional order in which each capacitor C2(*i*) is connected to node LT and each capacitor switch CS2(*i*) is connected to voltage rail P2. Capacitor switches CS2(1)-CS2(M) respectively connect capacitors C2(1)-C2(M) across, or disconnect capacitors C2(1)-C2(M) from, switch Q2 responsive to respective switch signals S2(1)-S2(M) applied to the capacitor switches by PSC 104. For example, programmable parallel capacitor bank 702 may connect none, some, or all of capacitors C2(1)-C2(M) across switch Q2 at any given time.

Capacitors C2(1)-C2(M) may have equal capacitances or may have different capacitances. For example, the capacitances may increase incrementally from C2(1) to C2(M). Thus, PSC 104 programs programmable parallel capacitor bank 702 to apply different selectable levels of capacitance across switch Q2. In other words, programmable parallel capacitor bank 702 includes (parallel) capacitors C2(1)-C2(M) configured to be connected across, or disconnected from, switch Q2 responsive to control signals S2(1)-S2(M) of CS Control, in order to connect different combinations of the parallel capacitors across the switch and achieve different capacitances across the switch. An advantage is that the parallel capacitance may be tuned for maximum effectiveness of ZVS depending on operating conditions during a welding process, as described below in connection with FIG. 10.

Similarly, programmable parallel capacitor bank 704 applies different levels of capacitance across switch Q4 under control of PSC 104. Programmable parallel capacitor bank 704 includes parallel capacitors C4(1)-C4(N) respectively connected in series with parallel capacitor switches CS4(1)-CS4(N) (where N>1, and may be the same as or different from M) from node RT to lower voltage rail P2 in the first positional order in which each capacitor C4(*i*) is connected to node RT and each capacitor switch is connected to lower voltage rail P2. Capacitor switches CS4(1)-CS4(N) respectively connect capacitors C4(1)-C4(N) across, or disconnect the capacitors from, switch Q4 responsive to respective switch signals S4(1)-S4(N) of CS Control. Thus, programmable parallel capacitor bank 704 may be programmed or controlled by PSC 104 to apply different levels of capacitance across switch Q4.

Figure 9:
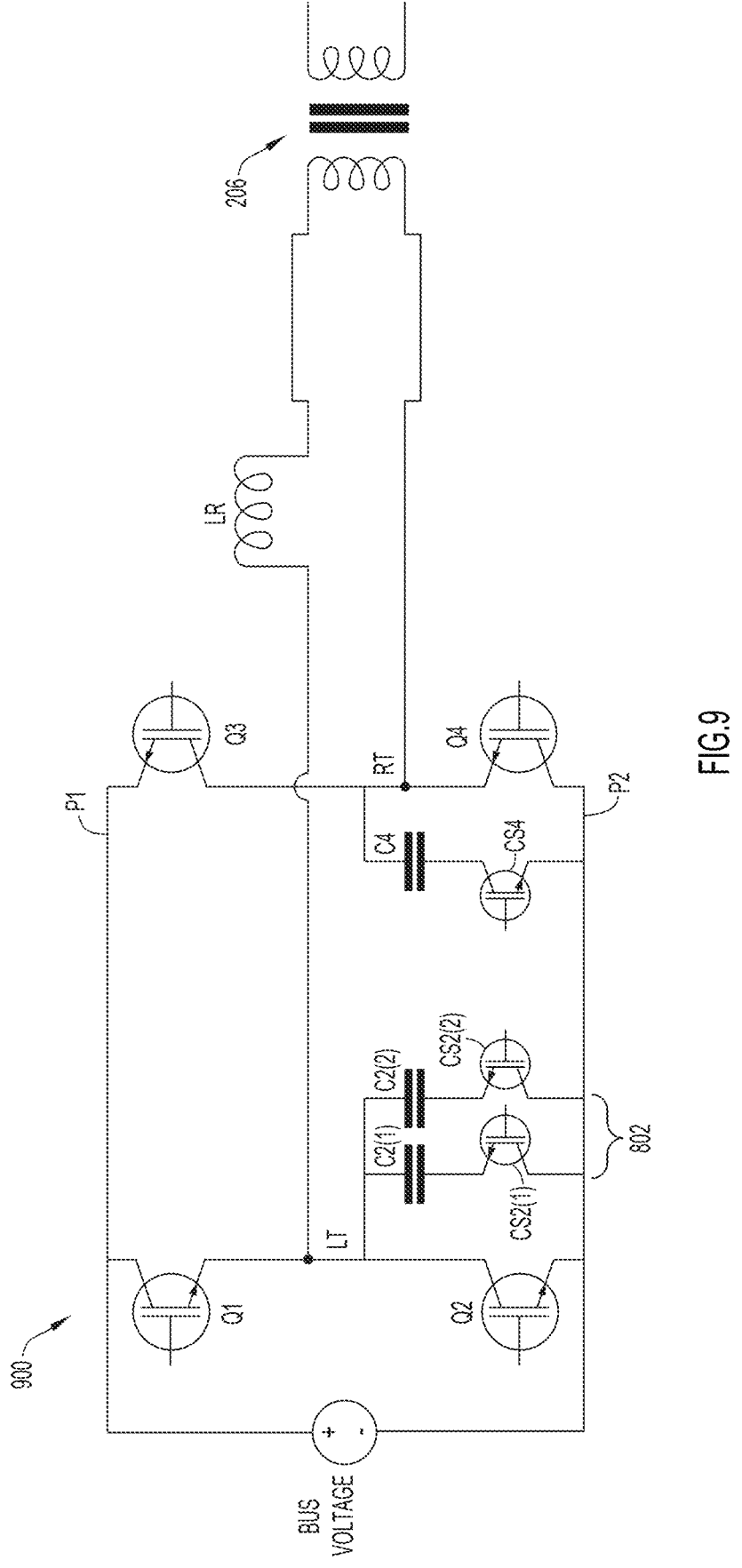
FIG. 9 shows yet another inverter with a programmable parallel capacitor bank.

In FIGS. 8 and 9, reference labels for the control signals applied to the capacitor switches are omitted for purposes of illustrative clarity, only. FIG. 8 shows an example inverter 800 with programmable parallel capacitor banks 802 and 804 similar to programmable parallel capacitor banks 702 and 704 of inverter 700, with M=2 and N=2, except that each series-connected capacitor and capacitor switch of programmable parallel capacitor banks 802, 804 is connected in the second positional order in which the capacitor is connected to one of nodes LT, RT, and each capacitor switch is connected to lower voltage rail P2.

FIG. 9 is an example inverter 900 similar to inverter 800 except that programmable parallel capacitor bank 804 is replaced with a single switched capacitor C4 across switch Q4.

FIG. 10 is a flowchart of an example method 1000 of controlling one or more ZVS/parallel capacitors (also referred to as "switched" or "switchable" capacitors) of an inverter (e.g., inverter 600, 650, 700, 800, or 900, and variations thereof) responsive to weld operating conditions of welding system 100 during a weld operation or process. The inverter includes switches that are switched ON and OFF at a switching frequency of the switching signals applied to the switches.

At 1002, PSC 104 stores predetermined configuration information used by the PSC as a basis to control when to connect the capacitors across (i.e., "connect the capacitors"), and disconnect the capacitors from (i.e., configure the capacitors so that they are not connected across), the switches. The predetermined configuration information defines a weld parameter (e.g., weld power/current) and instructions to connect or disconnect the capacitors when the weld parameter meets predetermined weld operating conditions of the weld process. For example, the predetermined configuration information may define ranges of and/or thresholds for the weld parameter (e.g., weld power/current ranges and/or thresholds) and map the ranges and/or thresholds to corresponding instructions directing the controller either to connect the capacitors in parallel with, or disconnect the capacitors from, the switches in each range/at each threshold. The instructions may direct that some, but not all, of the capacitors are to be connected in parallel, while others are to be disconnected. The configuration information can be quite complex in that different levels of capacitance may be defined for different operation conditions, and the different levels of capacitance may be implemented using the programmable parallel capacitance banks described above.

At 1004, PSC 104 monitors the weld parameter, and determines whether to connect the capacitors across the switches based on the weld parameter as monitored and the predetermined/defined weld operating conditions, which are mapped to corresponding capacitor connect or disconnect instructions).

In an example, when the weld parameter meets a first predetermined weld operating condition, at 1006, PSC 104 controls the capacitor switches to connect the capacitors across the switches, and the PSC maintains the capacitors in the connected state while the weld parameter continues to meet the first predetermined weld operating condition.

In the example, when the weld parameter meets a second predetermined weld operating condition (i.e., does not meet the first predetermined welding condition), at 1008, PSC 104 controls the capacitor switches to disconnect the capacitors from the switches, and maintains the capacitors in the disconnected state while the weld parameter continues to meet the second predetermined weld operating condition.

PSC 104 connects the capacitors in parallel with, or disconnects the capacitors from, the switches independently of the switching signals that control the switches, i.e., that repeatedly (i.e., cyclically) turn ON and turn OFF the switches at the switching frequency. That is, the timing associated with connecting the capacitors across, and disconnecting the capacitors from, the switches is independent of the timing associated with the switching signals.

In some instances, the weld parameter varies more slowly than the switching frequency of the switches. Therefore, the weld parameter may remain in the first predetermined weld operating condition continuously over a time period that covers multiple switching cycles (i.e., the time period is greater than a period of a switching cycle) before transitioning to the second predetermined weld operating condition. In response, PSC 104 keeps the capacitors connected across the switches continuously over the time period and across the multiple switching cycles while the weld parameter remains in the first predetermined weld operating condition. To do this, PSC 104 asserts the control signals to keep the capacitor switches always ON across the multiple switching cycles.

Similarly, the weld parameter may remain in the second predetermined weld operating condition continuously over a time period that covers multiple switching cycles before transitioning to the first predetermined weld operating condition. In response, PSC 104 keeps the capacitors disconnected from the switches continuously across the multiple switching cycles while the weld parameter remains in the second predetermined weld operating condition. To do this, PSC 104 asserts the control signals to keep the capacitor switches always OFF across the multiple switching cycles.

In an example in which PSC 104 uses weld power as a basis for connecting and disconnecting the capacitors, the PSC 104 may be configured with predetermined information that defines (i) ranges of weld power (e.g., weld current), and (ii) instructions for each range to either connect or disconnect the capacitors. During operation, PSC 104 monitors sensed weld power (e.g., sensed weld current), and either connects or disconnects the capacitors based on which range the sensed weld power falls. The predetermined configuration information may define the following instructions:

a. When the sensed weld current exceeds a weld current threshold (which represents a first predetermined weld operating condition that corresponds to a first current range), connect the capacitors across the switches.
b. When the sensed weld current does not exceed the weld current threshold (which represents a second predetermined weld operating condition that corresponds to a second current range, which is not the first current range), disconnect capacitors C1-C4 from switches Q1-Q4.

In an example in which PSC 104 uses stages of the weld process as a basis for connecting and disconnecting the capacitors, the predetermined configuration information may define (i) one or more predetermined welding stages of the weld process, and (ii) instructions for each predetermined welding stage to either connect or disconnect capacitors. During operation, PSC 104 monitors the welding stages of the weld process, and either connects or disconnects the capacitors depending on the welding stage. For example, the predetermined configuration information may define the following instructions:

a. When the welding stage is startup, connect the capacitors across the switches.
b. When the welding stage is not startup, disconnect capacitors from the switches.

Method 1000 may monitor multiple weld parameters to control connecting or disconnecting the parallel capacitor(s). That is, method 1000 may monitor one or more weld parameters to control connecting or disconnecting the parallel capacitor(s).

Figure 11A:
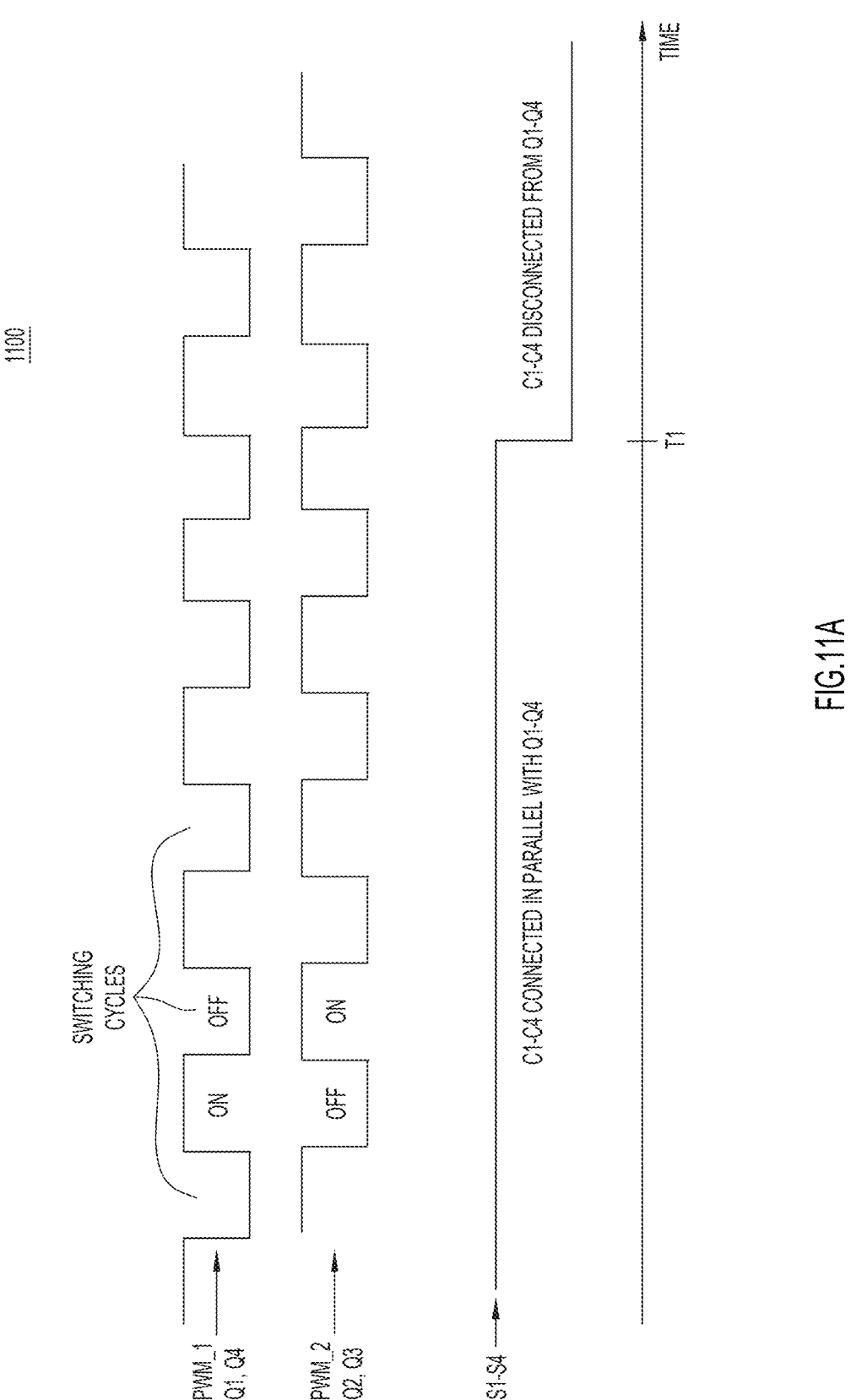
FIG. 11A shows example waveform for signals used to control the inverter of FIG. 6A.

FIG. 11A shows example waveforms 1100 for signals used to control inverter 600, including PWM waveforms PWM_1 and PWM_2, and capacitor switch signals S1-S4, according to method 1000. When switch signals S1-S4 are a logic 1 and a logic 0, capacitors C1-C4 are connected in parallel with, and disconnected from, switches Q1-Q4, respectively. As shown in FIG. 11A, up to time T1, capacitors C1-C4 are connected in parallel with switches Q1-Q4 continuously over multiple switching cycles of PWM_1 and PWM_2. After T1, capacitors C1-C4 are disconnected from switches Q1-Q4 continuously over multiple switching cycles of PWM_1 and PWM_2. The aforementioned relative timing relationship between the PWM waveforms and the capacitor switch signals similarly applies to the other inverter embodiments, including inverters 650, 700, 800 and 900, for example.

Figure 11B:
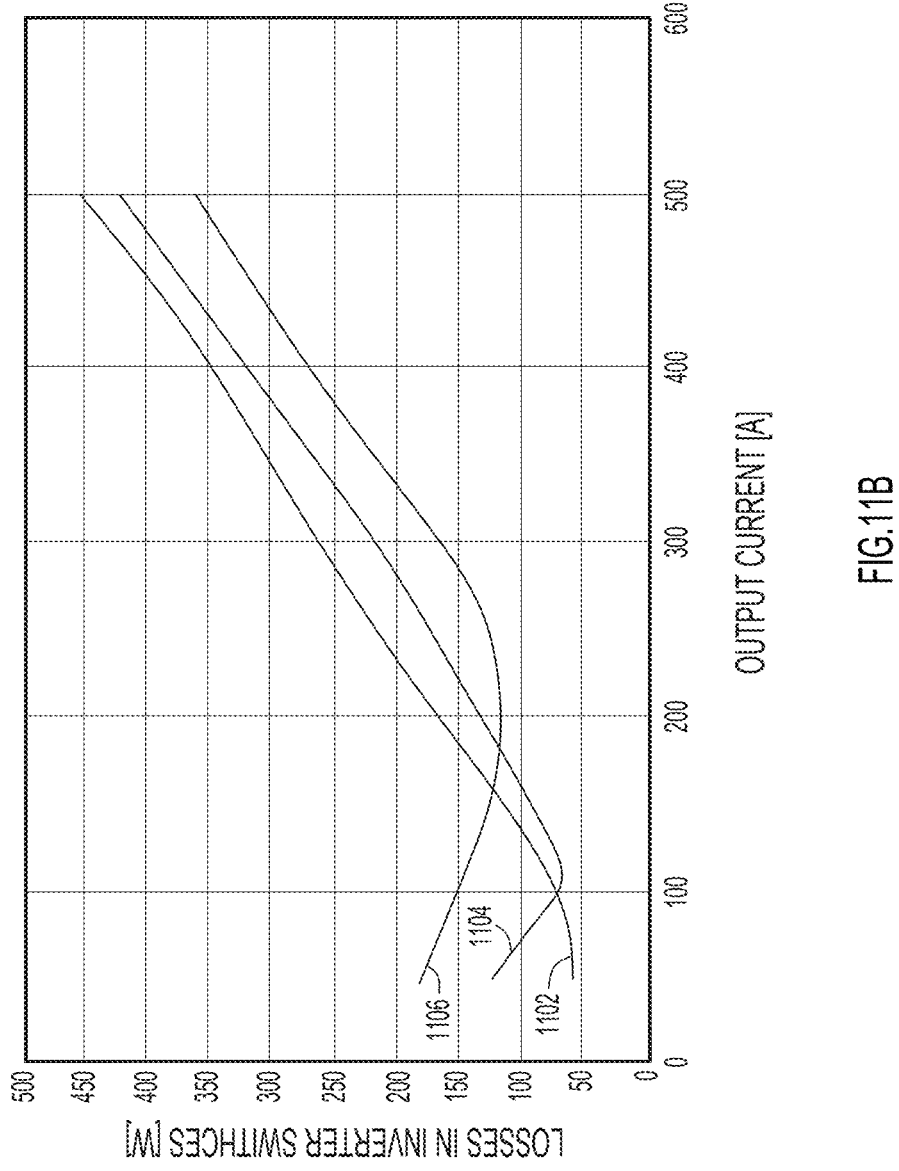
FIG. 11B shows example plots of inverter switching loss vs. weld current for different parallel capacitances (i.e., values of capacitance).

FIG. 11B shows plots of inverter switching loss vs. weld current for different parallel capacitances (i.e., values of capacitance). Specifically, plots 1102, 1104, and 1106 show inverter switching loss vs. output current for capacitances of 5 nF, 15 nF, and 40 nF, respectively. For each capacitance, the inverter switching loss varies as the weld current varies. Together, the plots convey, for each weld current value, a corresponding capacitance of the three capacitances that minimizes switching loss. For example, when the weld current=250 Amps, the capacitance=40 nF yields the lowest inverter switching loss.

The plots of FIG. 11B or similar plots may be used to generate a switching-loss minimizer that minimizes inverter switching loss as a function of the weld current and the capacitance. The switching-loss minimizer may map different weld current values to different capacitances that minimize inverter switching loss at each of the weld current values. For example, the switching-loss minimizer may store tuples of [weld current value, capacitance] that map different weld current values to corresponding capacitances that minimize the inverter switching loss.

FIG. 11C is a flowchart of an example method 1170 of using the switching-loss minimizer to control programmable parallel capacitor banks to minimize inverter switching loss dynamically under varying loads during a welding operation.

At 1172, PSC 104 monitors sensed weld current (or other parameter(s) indicative of weld power) to produce a sequence of weld current values.

At 1174, for each weld current value, PSC 104 accesses, from the switching-loss minimizer, a corresponding capacitance (value) that minimizes inverter switching loss at the weld current value.

At 1176, PSC 104 programs one or more programmable parallel capacitor banks (e.g., of FIG. 7) connected in parallel with one or more inverter switches to each implement the capacitance value.

Method 1170 is repeated over time.

Figure 12:
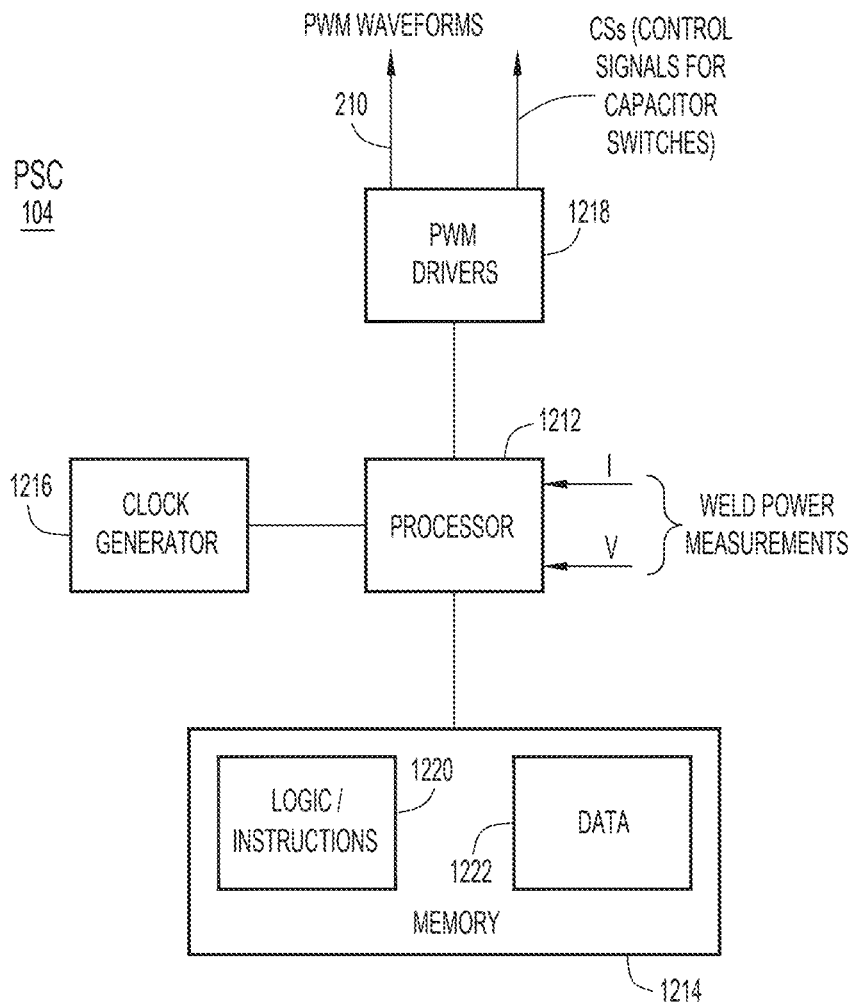
FIG. 12 is a block diagram of the PSC (also referred to as a "controller") according to an embodiment.

With reference to FIG. 12, there is a block diagram of PSC 104 (also referred to as a "controller") according to an embodiment. PSC 104 includes a processor 1212 (e.g., a microcontroller) (which may be implemented in hardware, software, or a combination thereof), a memory 1214, a clock generator 1216, and PWM drivers 1218 coupled with each other. PSC 104 receives sensed voltage and current (i.e., voltage and current measurements), and weld power settings, and generates PWM waveforms 210 to control the current and voltage waveforms produced by power supply 102 responsive to the PWM waveforms. PSC 104 also generates control signals CSs to control capacitor switches as described above. Memory 1214 stores non-transitory computer readable program instructions/logic instructions 1220 that, when executed by processor 1212, cause the controller to perform the operations described herein. Memory 1214 also stores data 1222 used and produced by processor 1212. Examples of data 1222 include values of waveform parameters and information that defines a predetermined variation scheme, as described above. Clock generator 1216 generates clocks and timing signals used to drive other components of PSC 104. In embodiments, components of PSC 104 may include electronic circuitry such as, for example, programmable logic circuitry, field-programmable gate arrays (FPGA), or programmable logic arrays (PLA) to execute the computer readable program instructions, which may include microcode, firmware, and so on.

As used herein, the term "connected to" (and similarly "coupled to"), unless specified otherwise, covers an arrangement in which components or terminals/nodes are directly connected to each other, and an arrangement in which the components or terminals/nodes are indirectly connected to each other through one or more intermediate components.

In summary, in some aspects, the techniques described herein relate to a system to generate weld power for a welding process, including: a power supply including a power inverter having multiple switches to be controlled by respective ones of multiple switching signals such that each switch is alternately turned ON and OFF within each switching cycle of a respective one of the multiple switching signals, to supply a current to an output circuit of the power supply that is configured to convert the current to the weld power, wherein the power inverter includes a capacitor and a capacitor switch connected in series with each other and across a switch of the multiple switches; and a controller to monitor a weld parameter and control the capacitor switch to either connect the capacitor across, or disconnect the capacitor from, the switch continuously across multiple cycles of a respective one of the multiple switching signals, depending on whether the weld parameter meets a predetermined operating condition of the welding process.

In some aspects, the techniques described herein relate to a system, wherein: the output circuit includes a transformer coupled to the multiple switches; and the capacitor and an inductance of the transformer form a resonant circuit for zero voltage switching (ZVS) of the switch.

In some aspects, the techniques described herein relate to a system, wherein: the output circuit further includes an inductor that is external to the transformer to form the resonant circuit.

In some aspects, the techniques described herein relate to a system, wherein the weld parameter is indicative of the weld power and the controller is configured to: when the weld parameter indicates that the weld power is in a first range, control the capacitor switch to connect the capacitor across the switch; and when the weld parameter indicates that the weld power is not in the first range, control the capacitor switch to disconnect the capacitor from the switch.

In some aspects, the techniques described herein relate to a system, wherein the weld parameter is indicative of a welding stage of the welding process and the controller is configured to: when the welding stage is a predetermined welding stage, control the capacitor switch to connect the capacitor across the switch; and when the welding stage is not the predetermined welding stage, control the capacitor switch to disconnect the capacitor from the switch.

In some aspects, the techniques described herein relate to a system, wherein: the power inverter further includes multiple capacitors connected in series with corresponding ones of multiple capacitor switches and across corresponding ones of the multiple switches; and the controller is configured to control each capacitor switch independently to connect each capacitor across, or disconnect each capacitor from, each switch continuously across the multiple cycles of each switching signal, depending on whether the weld parameter meets the predetermined operating condition of the welding process.

In some aspects, the techniques described herein relate to a system, wherein: the power inverter includes series-connected first and second switches connected from a first voltage rail to a second voltage rail, and to each other at a first node, and the capacitor and the capacitor switch are connected in series from the first node to a voltage rail of the first voltage rail or the second voltage rail.

In some aspects, the techniques described herein relate to a system, wherein: the capacitor is connected to the first node and the capacitor switch, and the capacitor switch is connected to the voltage rail.

In some aspects, the techniques described herein relate to a system, wherein: the capacitor is connected to one of the voltage rail and the first node, and the capacitor switch is connected to the first node.

In some aspects, the techniques described herein relate to a system to generate weld power for a welding process, including: a transformer; a power inverter having multiple switches that include a first upper switch and a first lower switch connected in series with each other and to the transformer, and a second upper switch and a second lower switch connected in series with each other and to the transformer, wherein the multiple switches are each configured to be switched ON and OFF cyclically responsive to respective ones of multiple switching signals to supply current to the transformer, which is configured to transform the current to a transformed current indicative of the weld power; and capacitors connected across (i) only the first upper switch and the second upper switch, or (ii) only the first lower switch and the second lower switch.

In some aspects, the techniques described herein relate to a system, wherein: the power inverter further includes an upper voltage rail and a lower voltage rail to apply a positive voltage and a negative voltage or a return, respectively; the first upper switch and the first lower switch are connected in series from the upper voltage rail to the lower voltage rail, and to each other at a first node; and the second upper switch and the second lower switch are connected in series from the upper voltage rail to the lower voltage rail, and to each other at a second node.

In some aspects, the techniques described herein relate to a system, wherein the capacitors include: a first capacitor having first opposing terminals respectively connected to the upper voltage rail and the first node; and a second capacitor having second opposing terminals respectively connected to the upper voltage rail and the second node.

In some aspects, the techniques described herein relate to a system, wherein the capacitors include: a first capacitor having first opposing terminals respectively connected to the first node and the lower voltage rail; and a second capacitor having second opposing terminals respectively connected to the second node and the lower voltage rail.

In some aspects, the techniques described herein relate to a system, wherein the power inverter further includes: capacitor switches connected in series with the capacitors and configured to selectively connect the capacitors across, or disconnect the capacitors from, (i) only the first upper switch and the second upper switch, or (ii) only the first lower switch and the second lower switch.

In some aspects, the techniques described herein relate to a system to generate weld power for a welding process, including: a transformer; a power inverter including: multiple switches configured to be switched ON and OFF by respective ones of multiple switching signals to supply a current to the transformer, which is configured to transform the current to a transformed current indicative of the weld power; and a capacitor bank having parallel capacitors configured to be connected across, or disconnected from, a switch of the multiple switches responsive to multiple control signals, in order to connect different combinations of the parallel capacitors across the switch and achieve different capacitances across the switch.

In some aspects, the techniques described herein relate to a system, wherein: the parallel capacitors are respectively connected in series with multiple capacitor switches across the switch, and the multiple capacitor switches are respectively configured to connect the parallel capacitors across, or disconnect the parallel capacitors from, the switch responsive to the multiple control signals.

In some aspects, the techniques described herein relate to a system, wherein: the multiple control signals represent a binary code having multiple logic bits configured to control the multiple capacitor switches, respectively, to connect the parallel capacitors, or disconnect the parallel capacitors, from the switch, respectively.

In some aspects, the techniques described herein relate to a system, further including: a controller to generate the multiple switching signals and the multiple control signals.

In some aspects, the techniques described herein relate to a system, wherein: the parallel capacitors and an inductance of the transformer form a resonant circuit for zero voltage switching (ZVS) of the switch.

In some aspects, the techniques described herein relate to a system, wherein: The power inverter includes an H-bridge inverter.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system to generate weld power for a welding process, comprising:

a power supply including a power inverter having multiple switches to be controlled by respective ones of multiple switching signals such that each switch is alternately turned ON and OFF within each switching cycle of a respective one of the multiple switching signals, to supply a current to an output circuit of the power supply that is configured to convert the current to the weld power, wherein the power inverter includes a capacitor and a capacitor switch connected in series with each other and across a particular switch of the multiple switches; and a controller to monitor a weld parameter and control the capacitor switch to either connect the capacitor across, or disconnect the capacitor from, the switch continuously across multiple cycles of a respective one of the multiple switching signals, depending on whether the weld parameter meets a predetermined operating condition of the welding process.

2. The system of claim 1, wherein:

the output circuit includes a transformer coupled to the multiple switches; and the capacitor and an inductance of the transformer form a resonant circuit for zero voltage switching (ZVS) of the particular switch.

3. The system of claim 2, wherein:

the output circuit further includes an inductor that is external to the transformer to form the resonant circuit.

4. The system of claim 1, wherein the weld parameter is indicative of the weld power and the controller is configured to:

when the weld parameter indicates that the weld power is in a first range, control the capacitor switch to connect the capacitor across the particular switch; and when the weld parameter indicates that the weld power is not in the first range, control the capacitor switch to disconnect the capacitor from the particular switch.

5. The system of claim 1, wherein the weld parameter is indicative of a welding stage of the welding process and the controller is configured to:

when the welding stage is a predetermined welding stage, control the capacitor switch to connect the capacitor across the particular switch; and when the welding stage is not the predetermined welding stage, control the capacitor switch to disconnect the capacitor from the particular switch.

6. The system of claim 1, wherein:

the power inverter further includes multiple capacitors connected in series with corresponding ones of multiple capacitor switches and across corresponding ones of the multiple switches; and the controller is configured to control each capacitor switch independently to connect each capacitor across, or disconnect each capacitor from, each switch continuously across the multiple cycles of each switching signal, depending on whether the weld parameter meets the predetermined operating condition of the welding process.

7. The system of claim 1, wherein:

the power inverter includes series-connected first and second switches connected from a first voltage rail to a second voltage rail, and to each other at a first node, and the capacitor and the capacitor switch are connected in series from the first node to a voltage rail of the first voltage rail or the second voltage rail.

8. The system of claim 7, wherein:

the capacitor is connected to the first node and the capacitor switch, and the capacitor switch is connected to the voltage rail.

9. The system of claim 7, wherein:

the capacitor is connected to the voltage rail and the capacitor switch, and the capacitor switch is connected to the first node.

\*    \*    \*    \*    \*